(12) United States Patent
Wu et al.

(10) Patent No.: US 9,137,528 B1
(45) Date of Patent: Sep. 15, 2015

(54) SYNCHRONIZING SPARSE CODING DICTIONARIES FOR USE IN COMMUNICATION SESSIONS

(71) Applicants: Ronghua Wu, Albany, CA (US); Qunshan Gu, Hayward, CA (US)

(72) Inventors: Ronghua Wu, Albany, CA (US); Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 413 days.

(21) Appl. No.: 13/631,058

(22) Filed: Sep. 28, 2012

(51) Int. Cl.
*H04N 11/02* (2006.01)
*H04N 19/00* (2014.01)

(52) U.S. Cl.
CPC ..................................... *H04N 19/00* (2013.01)

(58) Field of Classification Search
USPC ........................................ 375/240.01–240.29
See application file for complete search history.

(56) References Cited

U.S. PATENT DOCUMENTS

| | | | |
|---|---|---|---|
| 5,867,114 A * | 2/1999 | Barbir ........................... | 341/107 |
| 7,783,459 B2 | 8/2010 | Rozell et al. | |
| 2007/0195743 A1* | 8/2007 | Karaoguz ...................... | 370/338 |
| 2008/0170623 A1* | 7/2008 | Aharon et al. ........... | 375/240.22 |
| 2011/0228920 A1* | 9/2011 | Kagawa et al. .......... | 379/201.11 |
| 2012/0057799 A1 | 3/2012 | Nguyen et al. | |
| 2012/0106627 A1* | 5/2012 | Guo et al. ................ | 375/240.02 |
| 2012/0163451 A1 | 6/2012 | Cohen et al. | |
| 2013/0223523 A1* | 8/2013 | Moghadam et al. ..... | 375/240.03 |

FOREIGN PATENT DOCUMENTS

WO 9957900 A1 11/1999

OTHER PUBLICATIONS

Y-Lan Boureau, et al., Learning Mid-Level Features for Recognition, 8 pages. Courant Institute, New York University, NY.
Y-Lan Boureau, et al., A Theoretical Analysis of Feature Pooling in Visual Recognition, 8 pages, Courant Institute of Mathematical Sciences New York University, NY 10003.
Julien Mairal, et al., Online Dictionary Learning for Sparse Coding, Jun. 2008, 34 pages, INRIA-Willow project, Ecole Normale Superieure University of Minnesota, ICML, Montreal.

(Continued)

*Primary Examiner* — Dave Czekaj
*Assistant Examiner* — Leron Beck
(74) *Attorney, Agent, or Firm* — Young Basile Hanlon & MacFarlane P.C.

(57) ABSTRACT

Techniques for generating synchronized dictionaries for sparse coding to facilitate coding of video content are presented. During a communication session, an encoder associated with a first terminal generates a dictionary that is synchronized with a corresponding dictionary maintained by a decoder associated with a second terminal. The decoder uses the dictionary to facilitate decoding video content, based on sparse coding, received from the encoder. During a subsequent communication session between the first terminal and a third terminal, the dictionary is made available to a decoder associated with the third terminal. The encoder associated with the first terminal and decoder associated with the third terminal signal each other to identify the dictionary as being common between the encoder and decoder, and this common dictionary is used for coding content communicated between the encoder and decoder. The encoder and decoder can update the dictionary based on the subsequent video session.

14 Claims, 11 Drawing Sheets

(56) References Cited

OTHER PUBLICATIONS

Jinjun Wang et al., Locality-constrained Linear Coding for Image Classification, 8 pages, Akiira Media System, Palo Alto, CA, Beckman Institute, University of Illinois at Urbana-Champaign, NEC Laboratories America, Inc., Cupertino, CA.

Jianchao Yang, et al., Linear Spatial Pyramid Matching Using Sparse Coding for Image Classification, 8 pages, Beckman Institute, University of Illinois at Urbana-Champaign, NEC Laboratories America, Cupertino, CA 95014, USA.

Jianchao Yang, et al., Efficient Highly Over-Complete Sparse Coding Using a Mixture Model, 14 pages, Beckman Institute, University of Illinois at Urbana Champaign, IL, NEC Laboratories America, Cupertino, CA.

Jianchao Yang, et al., Supervised Translation-Invariant Sparse Coding, 8 pages, Beckman Institute, University of Illinois at Urbana-Champaign, NEC Laboratories America, Inc., Cupertino CA.

Xiao-Tong Yuan, et al., Visual Classification With Multi-Task Joint Sparse Representation, 8 pages, Department of Electrical and Computer Engineering, National University of Singapore, Singapore.

Xi Zhou, et al., Image Classification Using Super-Vector Coding of Local Image Descriptors, 14 pages, Dept. of ECE, University of Illinois at Urbana-Champaign, Illinois, NEC Laboratories America, CA, Department of Statistics, Rutgers University, New Jersey.

Christophe De Vleeschouwer, Matching Pursuits Video Coding: Sub-band Dictionaries and Bit Allocation Methodologies, Aug. 1999, 246 pages, Laboratoire De Telecommunications Et Teledetection, B-1348 Louvain-la-Neuve, Belgique, Universite Catholique de Louvain.

Gianluca Monaci, et al., Learning Bimodal Structure in Audio-Visual Data, 13 pages.

Ignacio Ramirez, et al., Classification and Clustering via Dictionary Learning With Structured Incoherence and Shared Features, 8 pages, Electrical and Computer Engineering, University of Minnesota.

Monaci, G., et al., Learning Multimodal Dictionaries, 1 page, Sep. 2007, IEEE Xplore Digital Library, vol. 16 Issue:9, http://ieeexplore.ieee.org/xpl/freeabs_all.jsp?arnumber=4287000&tag=1.

De Vleeschouwer Christophe, Matching pursuits video coding : sub-band dictionaries and bit allocation methodologie, Laboratoire De Telecommunications Et Teledetection, 2 pages, No. 1240, 1999, http://www.tele.ucl.ac.be/view-publication.php?language=Fr&id=1240.

Francis Bach, et al., Tutorial on Sparse Coding and Dictionary Learning for Image Analysis, CVPR 2010, CVPR 2010 Tutorial, 4 pages, Jun. 14, 2010.

Francis Bach, et al, ICCV Tutorial on Sparse Coding and Dictionary Learning for Image Analysis, ICCV 2009 Tutorial, 4 pages, Sep. 28.

Jiang. et al., "Learning a Discriminative Dictionary for Sparse Coding via Label Consistent K-SVD," 8 pages.

Mairal, et al., "Online Dictionary Learning for Sparse Coding," 8 pages.

Bach, et al., "Sparse Coding and Dictionary Learning for Image Analysis Part II: Dictionary Learning for signal reconstruction," ICCV'09 tutorial, Sep. 28, 2009,43 pages, Kyoto.

Yaghoobi, et al., "Parametric Dictionary Design for Sparse Coding," IEEE Transaction on Signal Processing, 11 pages.

* cited by examiner

SYNCHRONIZING SPARSE CODING DICTIONARIES FOR USE IN COMMUNICATION SESSIONS

CROSS REFERENCES TO RELATED APPLICATIONS

This application is related to co-pending U.S. patent application Ser. No. 13/426,127, entitled "GENERATING SYNCHRONIZED DICTIONARIES FOR SPARSE CODING", which was filed on Mar. 21, 2012.

TECHNICAL FIELD

This disclosure relates generally to video processing, and more specifically to synchronizing sparse coding dictionaries for use in communication sessions.

BACKGROUND

The amount of data representing media information, such as a still image and video image, can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality can require that more bits be used, which can, in turn, increase cost of transmission and/or storage. While lower bandwidth traffic may be desired so may higher quality media.

An encoder is a device capable of encoding (e.g., coding), and sometimes also decoding, digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Codec classifications can include, for example, discrete cosine transfer codecs, fractal codecs, and wavelet codecs. An encoder or codec, by encoding the digital media data, can reduce the number of bits required to transmit signals, which can thereby reduce associated transmission costs.

Sparse coding is a coding technique that potentially can be useful in improving video compression coding efficiency. In sparse coding, there can be a dictionary of elements, which may be trained based on offline images or video frames. The dictionary elements can be used to facilitate coding (e.g., sparse coding) of video content. Generally, the more accurate a dictionary is in representing video content to be coded, the more useful sparse coding can be in compressing the video content. Conversely, the less accurate a dictionary is in representing the video content to be coded, the more diminished the value of sparse coding may be in compressing the video content. Conventional dictionaries trained from generic images or video frames can be less optimal or accurate with regard to representing video content to be coded, may not be able to cover a wide variety of video compression scenarios, and can be inefficient in compressing video content.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to coding (e.g., encoding, decoding) video content based at least in part on sparse coding. Disclosed herein is a system that can include an encoder component that encodes at least a first set of video content associated with a video session. The system also can include a first dictionary management component that generates a set of dictionaries, based at least in part on a set of original video frames from the video session used as reference video frames, in relation to the video session between a first communication device and a second communication device, wherein the set of dictionaries facilitates the encoding of at least a portion of the first set of video content based at least in part on sparse coding.

Also disclosed herein is a method that includes employing at least one processor to facilitate execution of code instructions retained in at least one memory device. The at least one processor, in response to execution of the code instructions, performs operations comprising: generating a set of dictionaries, based at least in part on a set of original video frames from the video session used as reference video frames, in relation to the video session between a first terminal and a second terminal, wherein the set of dictionaries facilitates encoding of at least a first set of video content based at least in part on sparse coding; and encoding at least a portion of the first set of content based at least in part on at least the set of dictionaries Also disclosed herein is a system that can include a dictionary management component that receives at least a portion of a set of dictionaries generated, based at least in part on a set of original video frames from the video session used as reference video frames, in relation to a first video session between a first communication device and a second communication device, synchronizes at least the portion of the set of dictionaries with an encoder component associated with the first communication device in relation to a second video session, wherein the set of dictionaries facilitates decoding of at least a set of video content associated with the second video session based at least in part on sparse coding. The system also can include a decoder component that decodes the set of video content associated with the second video session between the first communication device and a third communication device associated with the decoder component to facilitate presentation of the set of video content by the third communication device.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
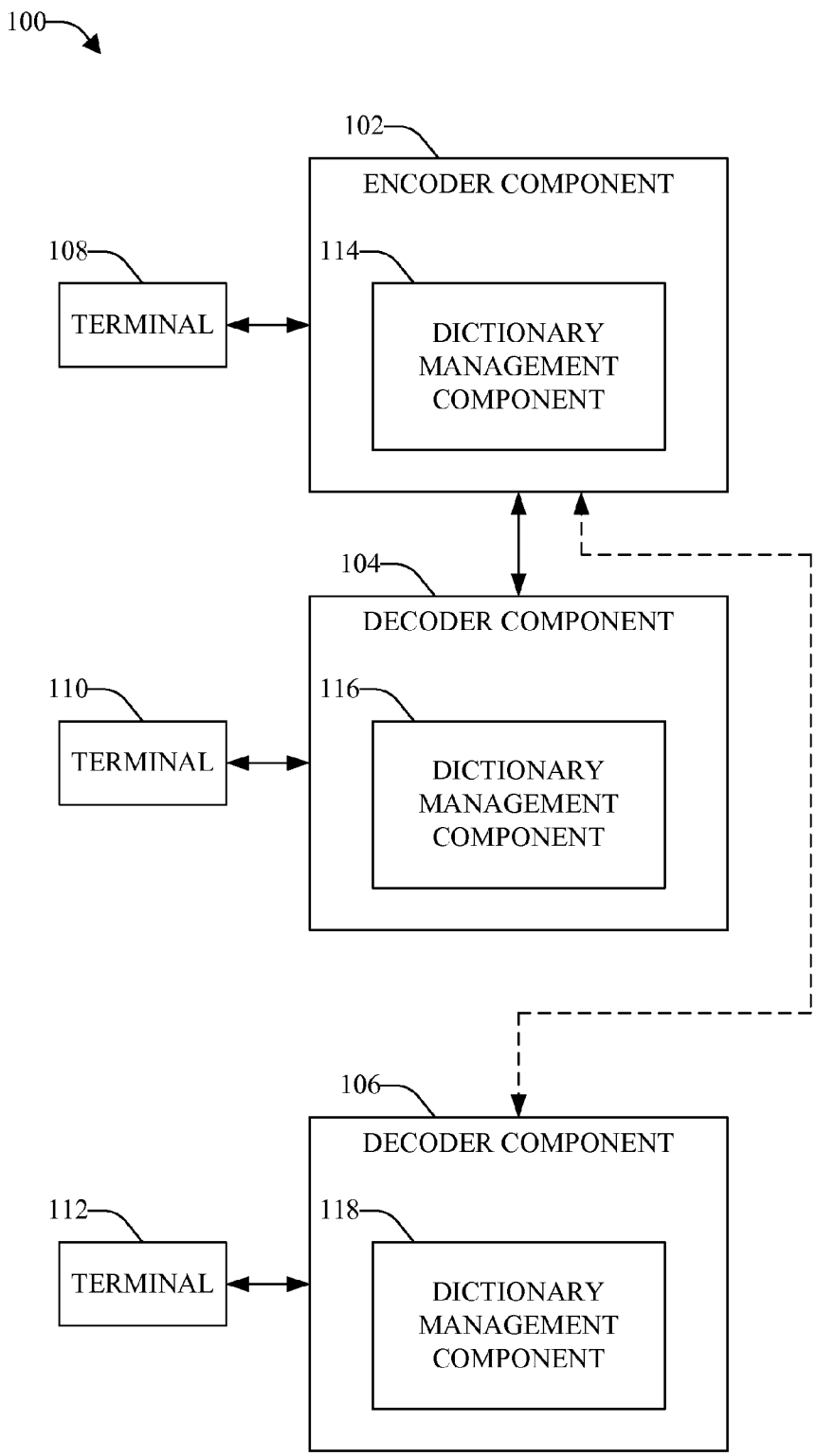
FIG. 1 illustrates a block diagram of an example system that can generate and maintain synchronized dictionaries for use in applying sparse coding to facilitate encoding and decoding video content in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The amount of data representing media information can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

An encoder is a device capable of encoding (e.g., coding) (and sometimes decoding) digital media data. A decoder is a device capable of decoding digital media data. Encoding digital media data can involve compressing the digital media data, and decoding of encoded digital media data can involve decompressing the encoded digital media data. A codec is a device capable of coding and/or decoding digital media data.

Sparse coding is a coding technique that can potentially improve video compression coding efficiency. In sparse coding, there can be a dictionary of elements, which can be based, for example, on reference video frames of a video session. The dictionary elements can be used to facilitate coding (e.g., sparse coding) of video content. Generally, the less accurate a dictionary is in representing the video content to be coded, the more diminished the value of sparse coding may be in compressing the video content. Conventional dictionaries trained from generic images or video frames can be less optimal or less accurate with regard to representing video content to be coded, may not be able to cover a wide variety of video compression scenarios, and can be inefficient in compressing video content.

Another issue with dictionaries for sparse coding of video content can be that the dictionaries generated during a video conference session between a first and second user at respective ends of the video conference session are only available to those users and associated communication devices that participated in the video conference session. During a subsequent video conference session between the first user and a third user, codecs associated with the communication devices of the first and third users may have to generate a new set of dictionaries for sparse coding of video content based at least in part on information (e.g., reference video frames) obtained by the codecs during the subsequent video conferencing session. This can be an inefficient procedure, since the dictionaries generated during the prior video conference session between the first and second users can have a certain amount of similarity to the new set of dictionaries because the first user's location may be the same with respect to both sets of dictionaries.

To that end, techniques for generating synchronized dictionaries for sparse coding to facilitate coding (e.g., encoding or decoding) of video content (e.g., in relation to video sessions) are presented. The disclosed techniques can use all or a portion of a set of dictionaries, which can be generated in relation to a communication session (e.g., video conference session) between a first entity (e.g., user) and a second entity in respective first and second locations, in a subsequent communication session between the first entity associated with the first location and a third entity associated with a third location to facilitate sparse coding of video content of the subsequent communication session.

A first encoder component (e.g., as part of a first codec) can be associated with (e.g., contained within or communicatively connected to) a first terminal. A second decoder component (e.g., as part of a second codec) can be associated with a second terminal. A third decoder (e.g., as part of a third codec) can be associated with a third terminal. The first terminal can be associated with a first location (e.g., a room, an office, a physical area, a geographical location, etc.), the second terminal can be associated with a second location, and the third terminal can be associated with a third location. In certain instances, the first terminal, second terminal, and/or third terminal can be associated with other respective locations at various times.

A dictionary (e.g., sparse coding dictionary) can include a set of dictionary elements that can be used by an encoder component and a decoder component to facilitate coding video content using sparse coding. Each of the first encoder component, second decoder component, and third decoder component, using respective dictionary management components, can utilize a same or corresponding defined coding-related algorithm(s), such as a sparse coding dictionary generation algorithm(s), to facilitate generating or modifying a dictionary and/or dictionary elements of a dictionary, or other information associated with a dictionary.

During a communication session between the first terminal and second terminal, the first encoder component and the second decoder component can generate a set of dictionaries (e.g., custom sparse coding dictionaries) based at least in part on information (e.g., reference video frames) obtained by the first encoder component and the second decoder component during the communication session, as more fully disclosed herein. The dictionary elements contained in the set of dictionaries can be based at least in part on the first location (e.g., background features, color features, items located within the scope of the camera, etc., associated with the first location). During communication sessions between the first and second terminals, the first encoder component and second decoder component can signal each other to synchronize dictionaries, including the set of dictionaries, common between the first encoder component and second decoder component based at least in part on respective unique identifiers (e.g., IDs) associated with respective dictionaries, as more fully disclosed herein. During a communication session, the first encoder component and the second decoder component can use the common dictionaries, including the set of new dictionaries, to facilitate coding video content communicated between the first encoder component and the second decoder component.

The set of dictionaries also can be used to facilitate coding video content during communication sessions between the first terminal (or second terminal) and the third terminal. In some implementations, the first encoder component or second decoder component can upload the set of dictionaries to a server (e.g., centralized server) that can be accessed by or can provide dictionaries to encoder components and decoder components to enable them to obtain dictionaries associated with respective encoder components, decoder components, entities, and/or locations.

For instance, the third decoder component can access the server and download the set of dictionaries in relation to an upcoming communication session between the first terminal and third terminal (e.g., in response to a notification of the upcoming communication session received from the first terminal). In certain implementations, the first encoder component or the server can transmit a notification message to codecs (or associated terminals or entities) that are on a contact list associated with the first encoder component to notify the codecs (or associated terminals or entities) that there is a new set of dictionaries associated with the first encoder component available. In other implementations, in addition to or as part of the notification message, the server can automatically transmit (e.g., automatically push) the new set of dictionaries to the contacts (e.g., third decoder component) on the contact list associated with the first encoder component. In some implementations, the first encoder component or first terminal can transmit (e.g., directly transmit) the set of dictionaries to the third decoder component or associated third terminal in relation to the upcoming communication session (e.g., without using a centralized server).

In still other implementations, the communication of dictionaries, including the set of dictionaries, to a coding device (e.g., codec, encoder component, decoder component) can occur in response to the coding device (or associated terminal or entity) accepting a meeting request relating to a communication session. For example, if another codec (or associated other terminal or other entity) is not a contact associated with the first codec (or associated first terminal or first entity), and the other entity accepts a meeting request for a session with the first codec, the accepting of the meeting request can trigger the sending of the set of dictionaries to the other codec (or associated other terminal or other entity) by the first codec (or associated first terminal or first entity).

During a subsequent communication session (e.g., the upcoming communication session) between the first terminal (e.g., from the first location) and the third terminal, the first encoder component and the third decoder component can signal each other to synchronize dictionaries in common between the first encoder component and the third decoder component. The first encoder component and third decoder component can exchange information regarding dictionaries respectively maintained by the first encoder component and third decoder component. The first encoder component and third decoder component can synchronize dictionaries by identifying dictionaries, such as the set of dictionaries, in common between the first encoder component and the third decoder component based at least in part on respective unique IDs associated with respective dictionaries. During that communication session, the first encoder component and the third decoder component can use the common dictionaries, including the set of dictionaries, to facilitate coding video content communicated between the first encoder component and the third decoder component.

In some instances, in relation to a communication session between the first terminal and third terminal, the third decoder component may not have been able to obtain all of the dictionaries in the set of dictionaries from the server or first encoder component (or first terminal) (e.g., due to time constraints). During the dictionary synchronization process, the first encoder component and the third decoder component can negotiate with each other to determine which dictionaries, if any, of the set of dictionaries are available (e.g., determine which dictionaries, if any, of the set have been obtained by the third decoder component) for use during the communication session. If only a subset of dictionaries of the set of dictionaries have been obtained by the third decoder component, the first encoder component and third decoder component can identify the subset of dictionaries as common dictionaries and can use the subset of dictionaries to facilitate coding video content during the communication session. If no dictionaries of the set of dictionaries have been obtained by the third decoder component, the first encoder component and third decoder component can use a base dictionary (e.g., base sparse dictionary) to facilitate coding video content during the communication session. A base dictionary can be a built-in dictionary that can contain generic dictionary elements (e.g., dictionary elements that are not unique to a particular terminal, codec, or location). An encoder component or a decoder component can use the base dictionary for coding video content, for example, when the encoder component, at one end of a session, and decoder component, at the other end of the session, do not have dictionaries in common or have a subset of dictionary elements in common that is insufficient for coding video content without also using the base dictionary.

During the subsequent communication session, the first encoder component and the third decoder component can update (e.g., modify) the set of dictionaries and/or can generate a different set of dictionaries based at least in part on information (e.g., reference video frames) obtained by the first encoder component and the third decoder component during the subsequent communication session associated with the first terminal and the third terminal, as more fully disclosed herein. The first encoder component (or associated first terminal) can upload the updated set of dictionaries and/or the different set of dictionaries to the server, and the updated set of dictionaries and/or different set of dictionaries can be made available to (e.g., automatically pushed to) contacts on the contact list associated with the first encoder component, as more fully disclosed herein. Additionally or alternatively, the first encoder component or associated first terminal can transmit the updated set of dictionaries and/or different set of dictionaries to another terminal or codec in relation to an upcoming communication session between the first terminal and the other terminal.

With regard to unique IDs, the first terminal can be associated with a first terminal address (e.g., Media Access Control (MAC) address), the second terminal can be associated with a second terminal address, and the third terminal can be associated with a third terminal address. As more fully disclosed herein, encoder components and decoder components, such as the first encoder component, second decoder component, and third decoder component, can generate unique IDs that can be associated with (e.g., linked to, mapped to, etc.) respective dictionaries. The unique IDs can have respective values that can be based at least in part on respective terminal addresses of terminals, respective dictionary sub-IDs of dictionaries, and respective location sub-IDs that can indicate respective locations of terminals.

An encoder component or decoder component can assign respective unique IDs to respective dictionaries to facilitate identifying dictionaries that are common between terminals (and respectively associated encoder component or decoder component) that are taking part in a communication session. Using the unique IDs, a user (e.g., a first user associated with the first terminal) can participate in communication sessions (e.g., make video conference calls) from a same location to different contacts (e.g., different users associated with different terminals), and the set of dictionaries associated with the terminal and the location can be used to facilitate coding video content during the respective communication sessions with the different contacts.

In some implementations, an encoder component or a decoder component can use a multi-tier structure for generating unique IDs. For example, an encoder component or a decoder component can structure a unique ID to include a first tier, a second tier, and a third tier. The first tier can include an address field that can contain a terminal address of a terminal (e.g., 48-bit address, or less or more than a 48-bit address). The second tier can include a dictionary sub-ID field, which can contain a dictionary sub-ID that can identify the particular dictionary. The dictionary sub-ID can have a desired number of bits (e.g., 16 bits, or less or more than 16 bits). The third tier can include a location sub-ID field, which can contain a location sub-ID that can identify the location associated with a particular dictionary. The location sub-ID can have a desired number of bits (e.g., 16 bits, or less or more than 16 bits). An encoder component or a decoder component can use the first tier to identify dictionaries that are common between the two terminals associated with the video session, the second tier to distinguish between different common dictionaries associated with the two terminals, and the third tier to distinguish between different locations associated with a terminal.

Referring now to the drawings, FIG. 1 illustrates a block diagram of an example system 100 that can generate and maintain synchronized dictionaries for use in applying sparse coding to facilitate encoding and decoding video content in accordance with various aspects and implementations described herein. The system 100 can generate dictionaries for sparse coding associated with a particular entity that can be used with multiple contacts (e.g., multiple entities) including, for example, entities (or associated terminals or codecs) on a contact list associated with the particular entity. The system 100 can use all or a portion of a set of dictionaries, which can be generated in relation to a communication session (e.g., video conference session) between a first entity and a second entity in respective first and second locations, in a subsequent communication session between the first entity associated with the first location and a third entity associated with a third location to facilitate sparse coding of video content associated with the subsequent communication session.

The system 100 can be used to compress or decompress video content, for example, associated with a video conferencing application or system, or other video applications or systems that may be associated with a significant amount of repetitive image features in visual images. The system 100 can utilize characteristics associated with certain video applications or systems, such as video conferencing applications or systems, to facilitate efficiently encoding and decoding video content. For example, video conferencing often can involve visual images or portions of visual images that are relatively highly repetitive in nature. For instance, a same or similar room, background, and/or camera angle, etc., often can be used during video sessions between two terminals and/or associated entities (e.g., users). When the room, background, camera angle, etc. is the same or similar, there typically is a relatively smaller amount of new information (e.g., visual information) in the visual images. The system 100 can build and maintain dictionaries (e.g., sparse coding dictionaries) based at least in part on information from a previous video session or an earlier portion of a current video session, and can effectively use the dictionaries to improve coding efficiency for video content being communicated using the system 100.

The system 100 can include an encoder component 102 that can encode received or captured digital media data (e.g., digital video content, audio content, multimedia content, etc.) to produce encoded digital media data as an output. The encoder component 102 can encode or compress the digital media data in accordance with a defined compression or encoding algorithm(s). The encoder component 102 can be a stand-alone unit, part of a codec, part of another component or unit, or can have portions of the encoder component 102 distributed in multiple components or units of the system 100.

The system 100 also can include a decoder component 104 and a decoder component 106 that respectively can decode received encoded digital media data (e.g., digital video content, audio content, multimedia content, etc.) to produce decoded or reconstructed digital media data as an output (e.g., for presentation on a display screen). Each of the decoder component 104 and decoder component 106 can decode or decompress the encoded digital media data in accordance with a defined decompression or decoding algorithm(s), which can correspond to the algorithm(s) used to encode the digital media data. Each of the decoder component 104 and decoder component 106 can be a stand-alone unit, part of a codec, part of another component or unit, or can have portions of the decoder component (e.g., 104, 106) distributed in multiple components or units of the system 100.

Figure 4:
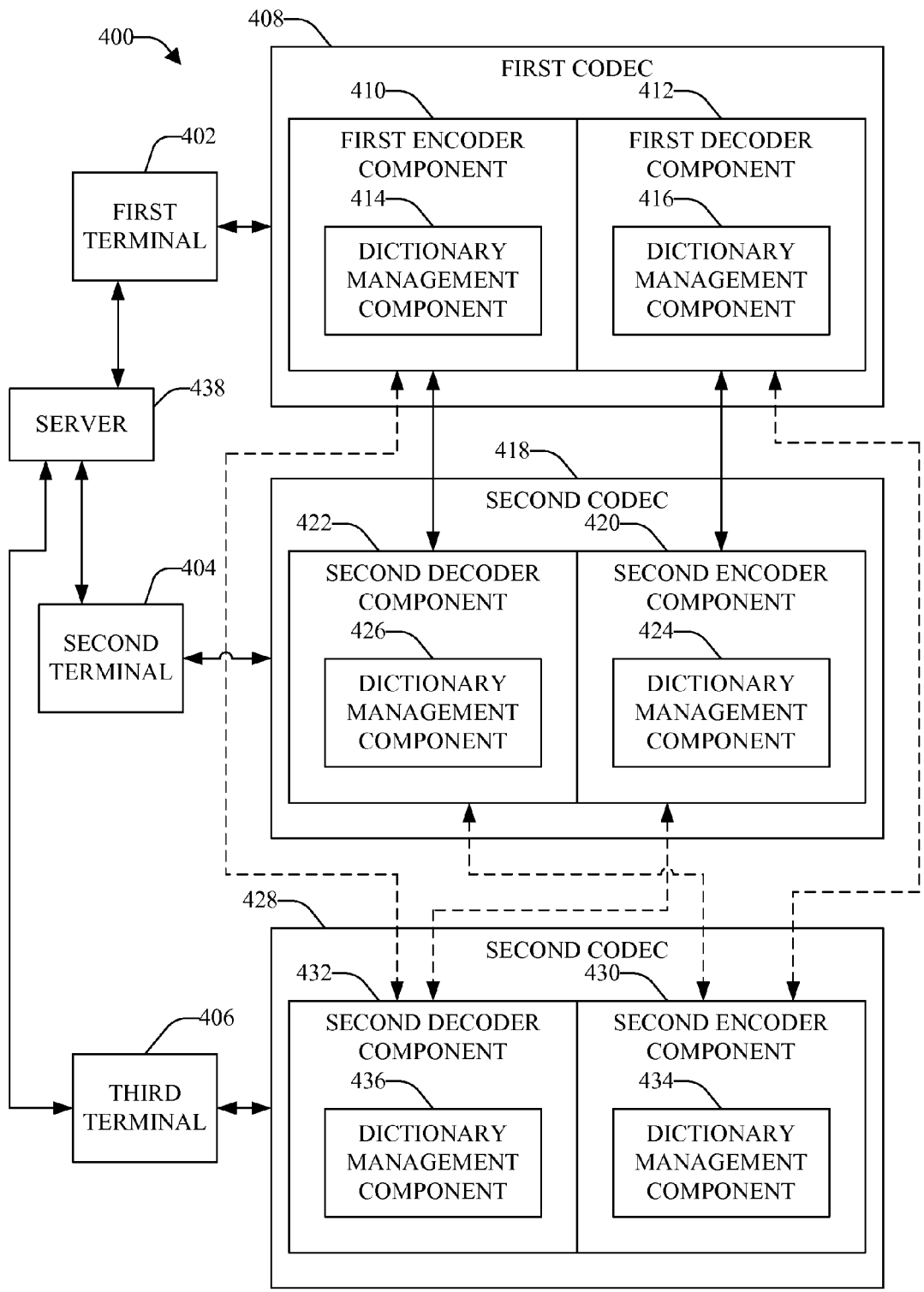
FIG. 4 illustrates a block diagram of example system that can employ a server to facilitate providing dictionaries to codecs, and codecs that can generate and maintain synchronized dictionaries for use in applying sparse coding to facilitate encoding and decoding video content, in accordance with various aspects and implementations.

In some implementations (e.g., as depicted in FIG. 4 and described herein), the encoder component 102 can be part of a codec (e.g., a first codec) that also can include a decoder component, which can decode encoded digital media data (e.g., received from another encoder component). Also, the decoder component 104 and/or the decoder component 106, respectively, can be part of another codec (e.g., decoder component 104 can be part of a second codec, and decoder component 106 can be part of a third codec) that can include an encoder component, which can encode digital media data (e.g., for transmission to the decoder component associated with the codec that also includes the encoder component 102).

The encoder component 102 can be associated with (e.g., contained within or communicatively connected to) a terminal 108 that can be used to receive or provide (e.g., display, transmit) information (e.g., video or audio content, data, etc.). The decoder component 104 can be associated with a terminal 110 that can be used to receive or provide information. The decoder component 106 can be associated with a terminal 112 that can be used to receive or provide information. A terminal (e.g., 108, 110, 112) can capture information (e.g., video or audio information), or can be associated with one or more components (e.g., capture devices, such as a camera; not shown in FIG. 1) that can capture information and provide the information to the terminal (e.g., for communication to another terminal), for example, during a video session. A terminal (e.g., 108, 110, 112) also can present (e.g., display, audially present, etc.) information to a user, for example, during a video session. A terminal (e.g., 108, 110, 112) can include, for example, a computer, a phone (e.g., a mobile phone and/or smart phone), an electronic tablet, an electronic gaming device, an application-specific computing device (e.g., communication device specifically for video conferencing), an Internet Protocol Television (IPTV), or a combination of communication devices and/or peripheral devices.

In accordance with exemplary implementations, the encoder component 102 can include a dictionary management component 114, the decoder component 104 can include a dictionary management component 116, and the decoder component 106 can include a dictionary management component 118. The dictionary management component 114, dictionary management component 116, and dictionary management component 118 can respectively generate, maintain, and/or modify one or more synchronized common dictionaries (e.g., common sparse coding dictionaries) for use in applying sparse coding to encode and decode video content. In some implementations, the dictionary management component 114, dictionary management component 116, and/or dictionary management component 118 can respectively have a built-in or defined dictionary that can be used for coding content. In accordance with various implementations, the dictionary management component 114, dictionary management component 116, and/or dictionary management component 118 can use a built-in or defined dictionary, can modify the built-in or defined dictionary, can generate a new dictionary based at least in part on the built-in or defined dictionary, or can generate a new dictionary that does not rely on the built-in or defined dictionary.

The system 100 can employ the respective dictionary management components (e.g., 114, 116, 118) to facilitate enabling the use, generation, and/or modification of dictionaries across multiple communication sessions and multiple communication devices. For instance, the dictionary management component 114 of the encoder component 102 and the dictionary management component 116 of the decoder component 104 can generate a set of dictionaries to facilitate coding content (e.g., video content) relating to the terminal 108 associated with a first location (e.g., a room, an office, a physical area, a geographical location, etc.) and the terminal 110 associated with a second location. When the terminal 108 associated with the first location is in a subsequent communication session with the terminal 112 associated with a third location, the dictionary management component 114 of the encoder component 102 and the dictionary management component 118 of the decoder component 106 can use all or a portion of the set of dictionaries to facilitate coding content associated with the subsequent communication session. In some instances, a terminal (e.g., 108, 110, 112) can be associated with different locations at various times. For example, in some instances the terminal 108 can be associated with the first location during a first communication session and a different location during a subsequent communication session.

A dictionary (e.g., sparse coding dictionary) can include a set of dictionary elements that can be used by the encoder component 102 and a decoder component (e.g., 104, 106) to facilitate coding video content using sparse coding. Each of the encoder component 102, decoder component 104, and decoder component 106, using the respective dictionary management components (e.g., 114, 116, 118), can utilize a same or corresponding defined coding-related algorithm(s), such as a sparse coding dictionary generation algorithm(s), to facilitate generating or modifying a dictionary and/or dictionary elements of a dictionary, or other information associated with a dictionary.

During a communication session between the terminal 108 and terminal 110, the dictionary management component 114 and the dictionary management component 116 can generate a set of dictionaries (e.g., custom sparse coding dictionaries) based at least in part on information (e.g., reference video frames) obtained by the dictionary management component 114 and the dictionary management component 116 during the communication session, as more fully disclosed herein. The dictionary elements contained in the set of dictionaries can be based at least in part on the first location (e.g., background features, color features, items located within the scope of the camera, etc., associated with the first location) associated with the terminal 108. During communication sessions between the terminal 108 and terminal 110, the dictionary management component 114 and the dictionary management component 116 can signal each other to synchronize dictionaries, including the set of dictionaries, common between the encoder component 102 and decoder component 104 based at least in part on respective unique identifiers (e.g., IDs) associated with respective dictionaries, as more fully disclosed herein. During a communication session, the encoder component 102 and the decoder component 104 can use the common dictionaries, including the set of new dictionaries, to facilitate coding video content communicated between the encoder component 102 and the decoder component 104.

The set of dictionaries also can be used to facilitate coding video content during communication sessions between the terminal 108 (e.g., when at the first location) and the terminal 112 associated with the third location. In some implementations, the dictionary management component 114 and/or the dictionary management component 116 can upload the set of dictionaries to a server (e.g., centralized server; not shown in FIG. 1, as depicted in FIG. 4) that can be accessed by or can provide dictionaries to encoder components and decoder components to enable them to obtain dictionaries associated with respective encoder components, decoder components, entities, and/or locations.

For instance, the decoder component 106 can access the server and download the set of dictionaries in relation to an upcoming communication session between the terminal 108 and the terminal 112 (e.g., in response to a notification of the upcoming communication session with the terminal 108). In certain implementations, the dictionary management component 114 of the encoder component 102 or the server can transmit a notification message to codecs (or associated terminals or communication addresses) that are on a contact list associated with the encoder component 102 to notify the codecs (or associated terminals or entities) that there is a new set of dictionaries associated with the encoder component 102 available. In other implementations, in addition to or as part of the notification message, the server can transmit (e.g., automatically push or transmit) the new set of dictionaries to the contacts (e.g., decoder component 106, associated terminal 112, or associated communication address) on the contact list associated with the encoder component 102. In some implementations, the encoder component 102 or the terminal 108 can transmit (e.g., directly transmit) the set of dictionaries to the decoder component 106, associated terminal 112, or associated communication address (e.g., email address, phone number, etc.) in relation to the upcoming communication session (e.g., without using a centralized server).

In still other implementations, the dictionary management component 114 (or the server) can transmit the dictionaries, including the set of dictionaries, to a coding device (e.g., codec, decoder component (e.g., 106)) in response to the coding device (or associated terminal (e.g., 112) or entity) accepting a meeting request relating to a communication session. For example, there can be an instance where another coding device (or associated other terminal (e.g., 112) or other entity) is not a contact associated with the first codec (or associated terminal 108 or first entity). The first entity, using the terminal 108, can transmit a meeting request to have the other entity participate in a communication session. The other entity, using the terminal 112, can accept the meeting request to participate in a communication session with the first entity associated with the terminal 108. The accepting of the meeting request by the other entity, using the terminal 112, can trigger the sending of the set of dictionaries to the other coding device (or to the associated terminal 112 or to a communication address (e.g., email address) associated with the other entity) by the first codec (or associated terminal 108) or the server.

During a subsequent communication session (e.g., the upcoming communication session) between the terminal 108 (e.g., from the first location) and the terminal 112 (e.g., from the third location), the dictionary management component 114 and the dictionary management component 118 can signal each other to synchronize dictionaries in common between the encoder component 102 and the decoder component 106. The dictionary management component 114 and the dictionary management component 118 can exchange information regarding dictionaries respectively maintained by the encoder component 102 and decoder component 106. The dictionary management component 114 and the dictionary management component 118 can synchronize dictionaries by identifying dictionaries, such as the set of dictionaries, in common between the encoder component 102 and the decoder component 106 based at least in part on respective unique IDs associated with respective dictionaries. During that communication session, the encoder component 102 and the decoder component 106 can use the common dictionaries, including the set of dictionaries, to facilitate coding video content communicated between the encoder component 102 and the decoder component 106 during the communication session.

In some instances, in relation to a communication session between the terminal 108 and terminal 112, the decoder component 106 may not have been able to obtain all of the dictionaries in the set of dictionaries, which are associated with the previous communication session between the terminal 108 and terminal 110, from the server or encoder component 102 (or associated terminal 108) (e.g., due to time constraints). During the dictionary synchronization process, the dictionary management component 114 and the dictionary management component 118 can negotiate with each other to determine which dictionaries, if any, of the set of dictionaries are available (e.g., determine which dictionaries, if any, of the set have been obtained by the decoder component 106) for use during the communication session. If only a subset of dictionaries of the set of dictionaries have been obtained by the decoder component 106, the dictionary management component 114 and the dictionary management component 118 can identify the subset of dictionaries as common dictionaries and can use the subset of dictionaries to facilitate coding video content during the communication session. If no dictionaries of the set of dictionaries have been obtained by the decoder component 106 and no other common dictionaries have been identified, the encoder component 102 and the decoder component 106 can use a base dictionary (e.g., base sparse dictionary) to facilitate coding video content during the communication session. A base dictionary can be a built-in dictionary that can contain generic dictionary elements (e.g., dictionary elements that are not unique to a particular terminal, codec, or location). An encoder component (e.g., 102) or a decoder component (e.g., 104, 106) can use the base dictionary for coding video content, for example, when the encoder component, at one end of a session, and decoder component, at the other end of the session, do not have dictionaries in common or have a subset of dictionary elements in common that is insufficient for coding video content without also using the base dictionary.

During the communication session between the terminal 108 and terminal 112, the dictionary management component 114 and the dictionary management component 118 can update (e.g., modify) the set of dictionaries and/or can generate a different set of dictionaries based at least in part on information (e.g., reference video frames) obtained by the dictionary management component 114 and the dictionary management component 118 during the communication session. The dictionary management component 114 (or associated terminal 108) or dictionary management component 118 (or associated terminal 112) can upload the updated set of dictionaries and/or the different set of dictionaries to the server, and the updated set of dictionaries and/or different set of dictionaries can be made available to (e.g., automatically pushed to) contacts on the contact list associated with the encoder component 102. Additionally or alternatively, the encoder component 102 or associated terminal 108 can transmit the updated set of dictionaries and/or different set of dictionaries to another terminal (e.g., 110), codec (e.g., comprising decoder component 104 associated with the terminal 110), or associated communication address, in relation to an upcoming communication session between the terminal 108 and the other terminal (e.g., terminal 110).

With regard to unique IDs (e.g., universally unique identifiers), the terminal 108 can be associated with a first terminal address (e.g., Media Access Control (MAC) address), the terminal 110 can be associated with a second terminal address, and the terminal 112 can be associated with a third terminal address. A dictionary management component (e.g., 114, 116, 118) of an encoder component (e.g., 102) or decoder component (e.g., 104, 106) can generate unique IDs that can be associated with (e.g., linked to, mapped to, etc.) respective dictionaries. The unique IDs can have respective values that can be based at least in part on respective terminal addresses of terminals, respective dictionary sub-IDs, and/or respective location sub-IDs.

A dictionary management component (e.g., 114, 116, 118) can assign respective unique IDs to respective dictionaries to facilitate identifying dictionaries that are common between terminals (e.g., 108, 110, 112) (and a respectively associated encoder component (e.g., 102) or decoder component (e.g., 104, 106)) that are taking part in a communication session. Using the unique IDs, a user (e.g., a first user associated with the terminal 108) can participate in communication sessions (e.g., make video conference calls) from a same location to different contacts (e.g., different users associated with different terminals (e.g., 110, 112)), and the set of dictionaries associated with the terminal 108 and that location can be used to facilitate coding video content during the respective communication sessions with the different contacts.

Figure 2:
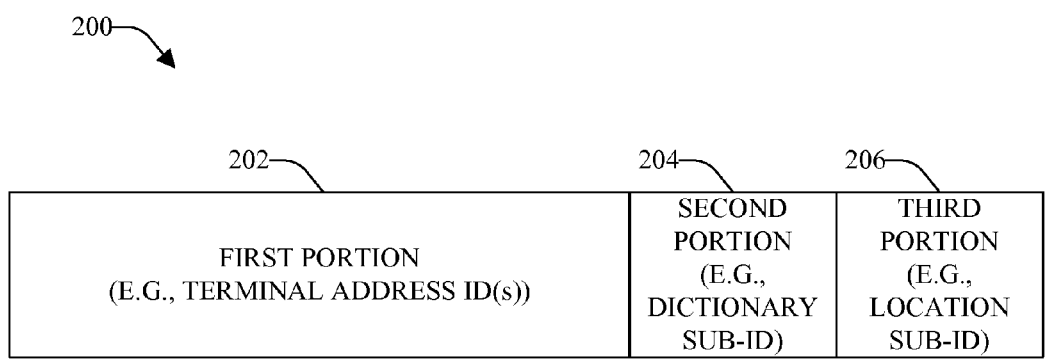
FIG. 2 depicts a diagram of an example unique identifier (ID) that can be assigned to a dictionary to uniquely identify that dictionary from other dictionaries associated with a same location and also from dictionaries associated with other locations, in accordance with various aspects and implementations.

In some implementations, a dictionary management component (e.g., 114, 116, 118) can use a multi-tier structure for generating unique IDs. Referring briefly to FIG. 2 (along with FIG. 1), FIG. 2 depicts a diagram of an example unique ID 200 that can be assigned to a dictionary (e.g., sparse coding dictionary) to uniquely identify that dictionary from other dictionaries associated with a same location and also from dictionaries associated with other locations, in accordance with various aspects and implementations. In some implementations, a unique ID 200 of a dictionary can include a first portion 202 (e.g., first tier, first field, first subset of bits for identification) that can contain an address (e.g., MAC address) or ID (e.g., terminal ID) associated with a terminal(s) (e.g., 108, 110, or 112) that is associated with the encoder component (e.g., 102) that is encoding the content and/or associated with the decoder component (e.g., 104, 106) that is decoding the content. The address or ID associated with a terminal (e.g., 108, 110, or 112) can have a desired number of bits (e.g., 48 bits, or more or less than 48 bits, e.g., for each of the terminals with which the address or ID is associated).

The unique ID 200 also can include a second portion 204 (e.g., second tier, second field, second subset of bits for identification) that can be a dictionary sub-ID that can be used to identify the dictionary from other dictionaries associated with the terminal and/or to distinguish between dictionaries common to the terminals (e.g., 108 and 110, or 108 and 112) participating in a communication session. The dictionary sub-ID associated with a dictionary can have a desired number of bits (e.g., 16 bits, or more or less than 16 bits). The unique ID 200 further can include a third portion 206 (e.g., third tier, third field, third subset of bits for identification) that can contain a location sub-ID that can identify the location associated with a particular dictionary. The location sub-ID can have a desired number of bits (e.g., 16 bits, or less or more than 16 bits). A dictionary management component (e.g., 114, 116, 118) can use the first tier to identify dictionaries that are common between the two terminals associated with the video session, the second tier to distinguish between different common dictionaries associated with the two terminals, and the third tier to distinguish between different locations associated with a terminal.

Figure 3:
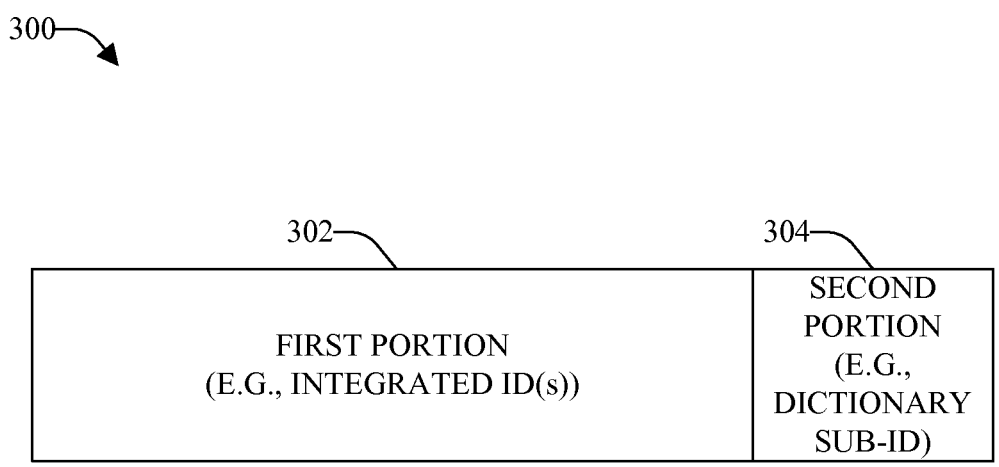
FIG. 3 illustrates a diagram of another example unique ID that can be assigned to a dictionary (e.g., sparse coding dictionary) to uniquely identify that dictionary from other dictionaries associated with a same location and also from dictionaries associated with other locations, in accordance with various aspects and implementations.

In some implementations, a dictionary management component (e.g., 114, 116, 118) can use an integrated multi-tier structure for generating unique IDs. Referring briefly to FIG. 3 (along with FIG. 1), FIG. 3 illustrates a diagram of another example unique ID 300 that can be assigned to a dictionary (e.g., sparse coding dictionary) to uniquely identify that dictionary from other dictionaries associated with a same location and also from dictionaries associated with other locations, in accordance with various aspects and implementations. In some implementations, the unique ID 300 of a dictionary can include a first portion 302 (e.g., first tier, first field, first subset of bits for identification) that can contain an integrated ID value, which can be based at least in part on an address (e.g., MAC address) or ID (e.g., terminal ID) associated with a terminal(s) (e.g., 108, 110, or 112) and location information (e.g., a location sub-identifier) associated with a location of the terminal. For example, a dictionary management component (e.g., 114, 116, 118) can integrate a terminal address and location information (e.g., geographical coordinates, room information (e.g., building address and/or room number), etc.) using a desired function to generate the integrated ID value. A dictionary management component (e.g., 114, 116, 118) can use the integrated IDs to facilitate identifying a terminal and a location associated with a dictionary, and to facilitate distinguishing dictionaries that are respectively associated with different terminals and/or different locations. The integrated ID associated with a terminal (e.g., 108, 110, or 112) and associated location can have a desired number of bits (e.g., 48 bits, or more or less than 48 bits). The unique ID 300 also can include a second portion 304 (e.g., second tier, second field, second subset of bits for identification) that can be a dictionary sub-ID that can be used to identify the dictionary from other dictionaries associated with the terminal and/or to distinguish between dictionaries common to a first terminal (e.g., 108) and another terminal (e.g., 110 or 112). The dictionary sub-ID can have a desired number of bits (e.g., 16 bits, or more or less than 16 bits).

With further regard to FIG. 1, during a communication session, dictionary management components (e.g., 114, 116) at each end of the session can coordinate with each other to facilitate generating dictionary elements that can be included in dictionaries. While certain aspects regarding generation of dictionary elements and dictionaries are described herein with regard to encoder component 102 and its associated dictionary management component 114, and decoder component 104 and its associated dictionary management component 116, such aspects are applicable to and/or can be performed by other encoder components and decoder components (e.g., 106) and associated dictionary management components (e.g., 118), respectively, for example, in relation to other communication sessions.

Before or during a video session, and/or when making calls (e.g., when making bi-directional calls using codecs, as shown in FIG. 4), between the terminal 108 and the terminal 110, the dictionary management component 114 and the dictionary management component 116 can exchange information to facilitate establishing the video session. The dictionary management component 114 and the dictionary management component 116 can exchange, for example, unique IDs with each other. The unique IDs provided by the dictionary management component 114 to the dictionary management component 116 can indicate the dictionaries maintained by the encoder component 102 to the dictionary management component 116. The unique IDs provided by the dictionary management component 116 to the dictionary management component 114 can indicate the dictionaries maintained by the decoder component 104 to the dictionary management component 114. The dictionary management component 114 can identify one or more dictionaries associated with the decoder component 104 that are common to the encoder component 102, based at least in part on the respective unique IDs of the respective dictionaries. The dictionary management component 116 also can identify one or more dictionaries associated with the encoder component 102 that are common to the decoder component 104, based at least in part on the respective unique IDs of the respective dictionaries. By respectively identifying common dictionaries, the dictionary management component 114 and the dictionary management component 116 can synchronize with each other to identify a subset of dictionaries common to both the encoder component 102 and the decoder component 104. The dictionary management component 114 and the dictionary management component 116 can respectively control operations of the encoder component 102 and the decoder component 104 to use one or more of the common dictionaries for coding of video content during a video session between the terminal 108 and the terminal 110.

During or after a video session, the dictionary management component 114 and the dictionary management component 116 can generate (e.g., dynamically or automatically) new dictionaries or modify (e.g., dynamically or automatically) existing dictionaries (e.g., dictionary on the side of the encoder component 102 and a corresponding or common dictionary on the side of the decoder component 104). The dictionary management component 114 can use a defined coding-related algorithm(s), such as a sparse coding dictionary generation algorithm(s), that can be used to generate or modify a dictionary and/or elements or other information associated with a dictionary of the encoder component 102. The dictionary management component 116 can use a corresponding defined coding-related algorithm(s) (e.g., a decoder-side sparse coding dictionary generation algorithm(s)) that can be used to generate or modify a dictionary and/or dictionary elements or other information associated with a dictionary of the decoder component 104. The algorithm(s) on the side of the decoder component 104 can correspond with the algorithm(s) on the side of the encoder component 102.

In some implementations, during a video session between the terminal 108 and the terminal 110, the dictionary management component 116, using the defined coding-related algorithm(s), can select (e.g., dynamically or automatically) one or more video frames (e.g., reconstructed video frames) that can be candidates to be used as reference video frames to build a new dictionary or modify an existing dictionary that can be common to the encoder component 102 and the decoder component 104. A reference video frame and/or information associated therewith can be a new dictionary element(s) that the dictionary management component 116 can add to the new or existing common dictionary on the decoder-component side.

The dictionary management component 116 can select a video frame to be a reference video frame based at least in part on one or more defined coding criterion. The coding criterion can relate to, for example, the quality of the video information associated with the video frame, scene change detection (e.g., whether the scene in the video frame is changing or is relatively static), etc. When the dictionary management component 116 selects a video frame from the video session as a reference video frame for use in generating new dictionary elements that can be included in a new or existing common dictionary, the dictionary management component 116 can identify a frame ID (e.g., picture ID) associated with the reference video frame. As more fully disclosed herein, the frame ID associated with the reference video frame can facilitate enabling the encoder component 102 and decoder component 104 to generate the same dictionary elements that can be included in new or existing common dictionaries (e.g., dictionaries that the encoder component 102 and decoder component 104 have in common with each other).

The dictionary management component 116 can transmit a message, which can include the frame ID associated with the reference video frame, to the dictionary management component 114 of the encoder component 102. In some implementations, the encoder component 102 and the decoder component 104 can establish a secure communication channel between each other, and the message can be communicated from the decoder component 104 to the encoder component 102 via the secure communication channel. The secure communication channel can enable the decoder-component side dictionary management component 116 to detect whether the message has been received by the encoder component 102 so that the dictionary management component 116 can know whether the encoder-component side dictionary management component 114 received the message. In other implementations, the message can be sent to the encoder component 102 via another desired communication channel established between the encoder component 102 and the decoder component 104. As desired, to facilitate determining whether the message was received by the encoder-component side dictionary management component 114, the encoder-component side dictionary management component 114 can generate and transmit a confirmation message via the secure communication channel or the other communication channel. In some implementations, when the dictionary management component 114 and the dictionary management component 116 use the secure communication channel, a confirmation message may not be employed. Knowing whether the dictionary management component 114 received the message can enable the dictionary management component 116 and the dictionary management component 114 to maintain synchronization of their common dictionaries, to generate new or modify existing common dictionaries, and/or to add corresponding elements to their common dictionaries, based at least in part on corresponding reference frames.

The dictionary management component 114 can receive the frame ID. Using a defined coding algorithm(s) that can correspond to the defined coding algorithm(s) used on the decoder-component side, the dictionary management component 114 can identify, and select as a candidate reference video frame, the video frame (e.g., same or corresponding video frame) on the encoder-component side that corresponds to the reference video frame selected on the decoder-component side, based at least in part on the frame ID. The dictionary management component 114 can add information relating to the corresponding video frame to an existing common dictionary or can create a new common dictionary.

In some implementations, the dictionary management component 114 can select the corresponding original video frame associated with a frame ID as the candidate reference video frame. In other implementations, the dictionary management component 114 can select the corresponding reconstructed video frame associated with a frame ID as the candidate reference video frame. The original video frame can be a better choice than the reconstructed reference video frame, as a dictionary element generated using the original video frame can provide for better coding quality and efficiency than a dictionary element generated using a reconstructed video frame.

The dictionary management component 114 and the dictionary management component 116 can respectively generate, maintain, or modify dictionaries during a video session (e.g., in real time (e.g., "on the fly")) or offline after the video session is completed. The dictionary management component 114 and the dictionary management component 116 respectively can store information (e.g., frame IDs, information relating to reference video frames, parameter values, etc.) for generating, maintaining, or modifying dictionaries associated with a video session in a data store for further processing (e.g., offline processing) at a desired time (e.g., when the video session is completed).

As disclosed, the dictionary management component 114 and the dictionary management component 116 can update or generate (e.g., dynamically) new common dictionaries or new dictionary elements during a video session between the terminal 108 and the terminal 110. There may be times when one of the dictionary management components (e.g., 116) completes an update on a common dictionary, generates a new dictionary, or generates a new dictionary element(s) before the other dictionary management component (e.g., 114) has done so. It can be desirable to use an updated or new common dictionary or new dictionary elements during the session, while also ensuring that the encoder component 102 and decoder component 104 are using corresponding (e.g., identical) common dictionaries during the video session.

In some implementations, to facilitate maintaining dictionary synchronization, at desired times during the video session, the dictionary management components (e.g., 114, 116) can re-synchronize to identify common dictionaries before using new dictionary elements, updated common dictionaries, or new common dictionaries generated during the video session. The dictionary management component 114 and the dictionary management component 116 can communicate messages (e.g., synchronizing messages) to each other to let one dictionary management component know when the other dictionary management component has generated new dictionary elements, modified a common dictionary, or generated a new dictionary (e.g., for use as a common dictionary).

In some implementations, for newly generated dictionaries (e.g., completely new or based on a pre-existing common dictionary), at desired times during the video session, the dictionary management components (e.g., 114, 116) can re-synchronize to identify common dictionaries, based at least in part on unique IDs associated with the newly generated common dictionaries. This can be performed in a similar manner as was performed at the beginning of the video session.

In other implementations, with regard to updated versions of pre-existing common dictionaries, at desired times during the video session, the dictionary management components (e.g., 114, 116) can re-synchronize to identify common dictionaries, including updated versions of common dictionaries, based at least in part on unique IDs and/or unique dictionary-version IDs associated with the common dictionaries. The dictionary management components (e.g., 114, 116) can generate and use unique dictionary-version IDs, in accordance with the defined coding algorithm(s), to distinguish between different versions of updated common dictionaries.

In still other implementations, regarding newly generated dictionary elements for common dictionaries, at desired times during the video session, the dictionary management components (e.g., 114, 116) can communicate messages to each other to re-synchronize to identify the newly generated dictionary elements based at least in part on unique dictionary-element IDs associated with the newly generated dictionary elements. For example, the unique dictionary-element IDs can be based at least in part on a frame ID associated with the reference video frame from which the dictionary element(s) is derived, in accordance with the defined coding algorithm(s). The dictionary generation components (e.g., 114, 116) can perform re-synchronization relating to common dictionaries, for example, at periodic times during the session or dynamically in response to an event (e.g., when an update to a common dictionary is completed). As a result, the dictionary management component 114 and the dictionary management component 116 can maintain synchronization of common dictionaries, including updated common dictionaries, and can use a new common dictionary element(s) as such element(s) is generated during the video session.

FIG. 4 illustrates a block diagram of example system 400 that can employ a server (e.g., centralized server) to facilitate providing dictionaries to codecs, and codecs that can generate and maintain synchronized dictionaries for use in applying sparse coding to facilitate encoding and decoding video content, in accordance with various aspects and implementations. The system 400 can comprise a first terminal 402, a second terminal 404, and a third terminal 406. A terminal (e.g., first terminal 402) can be communicatively connected to another terminal (e.g., second terminal 404 or third terminal 406) at desired times (e.g., during a video session). The connection can be a wireline or a wireless connection. A terminal (e.g., first terminal 402) and another terminal (e.g., second terminal 404 or third terminal 406) can communicate video content to each other. In some implementations, the video content can be part of a video conferencing session involving a first subset of users perceiving (e.g., viewing) video content received from the other terminal (e.g., second terminal 404 or third terminal 406) via the first terminal 402, and a second subset of users perceiving video content received from the first terminal 402 via the other terminal (e.g., second terminal 404 or third terminal 406).

The first terminal 402 can include or be associated with a first codec 408 that can include a first encoder component 410 and first decoder component 412. The first encoder component 410 can contain a dictionary management component 414, and the first decoder component 412 can contain a dictionary management component 416. The second terminal 404 can include or be associated with a second codec 418 that can include a second encoder component 420 and second decoder component 422. The second encoder component 420 can include a dictionary management component 424, and the second decoder component 422 can contain a dictionary management component 426. The third terminal 406 can include or be associated with a third codec 428 that can include a third encoder component 430 and third decoder component 432. The third encoder component 430 can include a dictionary management component 434, and the third decoder component 432 can contain a dictionary management component 436.

Respective encoder components (e.g., 410, 420, 430) can be the same as or similar to, and/or can include the same or similar features as, any of the encoder components as more fully described herein. Respective decoder components (e.g., 412, 422, 432) can be the same as or similar to, and/or can include the same or similar features as, any of the decoder components as more fully described herein. Respective dictionary management components (e.g., 414, 424, 434) associated with respective encoder components can be the same as or similar to, and/or can include the same or similar features as, any of the dictionary management components associated with encoder components as more fully described herein. Respective dictionary management components (e.g., 416, 426, 436) associated with respective decoder components can be the same as or similar to, and/or can include the same or similar features as, any of the dictionary management components associated with decoder components as more fully described herein.

The system 400 also can include a server 438 that can be used distribute dictionaries to various recipients (e.g., codecs, associated terminals, or associated users) to facilitate use of the dictionaries across different users. In some implementations, the server 438 can be a centralized server that can communicatively connect to and communicate with the terminals 402, 404, and 406, respectively associated codecs 408, 418, and 428, and/or communication addresses (e.g., email, phone, or other destination addresses) of users respectively associated with the terminals 402, 404, and 406 via a wireline or wireless communication network. The wireline or wireless communication network can include, for example, For each user or at least some users, a user can use a terminal (e.g., 402) and/or codecs (e.g., 408 via the respectively associated dictionary management components 414 or 416) to generate and maintain contact lists relating to other users associated with the user. A contact list can include information, including contact names of other users associated with the user, respective communication addresses or contact information of these other users, terminal ID information of terminals associated with these other users, dictionaries or unique IDs associated with these other users, user preferences relating to distribution of dictionaries to other users, etc. The terminal (e.g., 402) or codec (e.g., 408) can provide the contact list to the server 438, and the server 438 can maintain the contact list of the user in a user profile associated with the user. In some implementations, a dictionary management component associated with a codec can maintain the contact list to facilitate controlling distribution of dictionaries to other codecs, or terminals or communication addresses associated with the other codecs.

After a communication session is completed (e.g., between the first terminal 402 and the second terminal 404), the dictionary management component (e.g., 414) of a codec (e.g., 408) can facilitate uploading (e.g., transmitting) a set of dictionaries generated in relation to the communication session to the server 438. Each dictionary can be associated with its own unique ID, which can be based at least in part on the terminal ID, dictionary sub-ID, and/or location sub-ID, as more fully disclosed herein.

The server 438 can receive the set of dictionaries and associated information, and can store the set of dictionaries and associated information, for example, in a data store. The server 438 can analyze information relating to the received dictionaries and associated information, and can identify the user or associated terminal (e.g., 402) or codec (e.g., 408) related to the set of dictionaries. The server 438 can retrieve a contact list and/or user profile associated with the user from, for example, the data store. Based at least in part on user preferences associated with the user, the server 438 can transmit (e.g., automatically) the set of dictionaries, or a notification message that notifies another user(s) about the set of dictionaries, to a communication address(es), terminal(s) (e.g., 406), codec (e.g., 428), etc., associated with the other user(s).

A communication address(es), terminal(s) (e.g., 406), codec (e.g., 428), etc., of another user(s) (e.g., on the contact list of the user) can receive the notification or the associated set of dictionaries. In response, the other user(s), terminal(s) (e.g., 406), codec (e.g., 428), etc., can respond to the notification to obtain the set of dictionaries from the server 438 and/or store the received set of dictionaries in a data store (e.g., data store associated with a codec). For example, a dictionary management component (e.g., 434, 436) associated with another terminal (e.g., 406) can receive (e.g., automatically) a notification regarding the set of dictionaries, or can receive (e.g., automatically) the set of dictionaries, from the server 438. The dictionary management component can respond (e.g., automatically) to the notification to obtain the set of dictionaries from the server 438 and/or can store (e.g., automatically) the received set of dictionaries in a data store (e.g., data store associated with the third codec 428).

During a subsequent communication session between the first terminal 402 and the other terminal (e.g., third terminal 406), the other terminal (e.g., third terminal 406) can use all or at least some of the set of dictionaries to facilitate coding (e.g., using sparse coding) of video content during that communication session. If the other codec (e.g., third codec 428 (e.g., particularly decoder component 432 of the third codec 428)) has not received all of the dictionaries of the set of dictionaries by the time the communication session, the dictionary management component(s) (e.g., 436) of the other codec (e.g., third codec 428) can negotiate and synchronize with the dictionary management component(s) (e.g., 414) of the first codec 408 to identify a subset of the set of dictionaries that the other codec (e.g., 428) has available for use during the communication session.

In still other implementations, the server 438 can transmit the set of dictionaries to the other codec (e.g., third codec 428) in response to the other codec (or associated terminal (e.g., 406) or user) accepting a meeting request relating to the communication session. For example, there can be instances where the other codec (or associated other terminal or user) is not a contact associated with the first codec 408 (or associated first terminal 402 or first entity) or otherwise does not receive the set of dictionaries via the server 438 (e.g., based on user preferences of the user associated with the first codec 408). The user, using the first terminal 402, can transmit a meeting request to have the other user associated with the other terminal (e.g., third terminal 406) requesting the other user to participate in a communication session. The other user, for example, using the other terminal (e.g., third terminal 406), can accept the meeting request to participate in the communication session with the user associated with the first terminal 402. The accepting of the meeting request by the other user, using the other terminal, can trigger the sending of the set of dictionaries to the other codec (e.g., third codec 428) (or to the associated third terminal 406 or to a communication address (e.g., email address) associated with the other user) by the server 438 or the first codec 408 (or associated first terminal 402).

The system 400 has been described herein to have respective dictionary management components (e.g., 414, 416, 424, 426, 434, 436) for the first encoder component 410, first decoder component 412, second encoder component 420, second decoder component 422, third encoder component 430, and third decoder component 432, respectively. In some implementations, an encoder component (e.g., 410, 420, 430) and a decoder component (e.g., 412, 422, 432) of a codec (e.g., 408, 418, 428) can share a same dictionary management component and/or another component(s) (e.g., processor component, data store, analyzer component, etc.) associated therewith.

Figure 5:
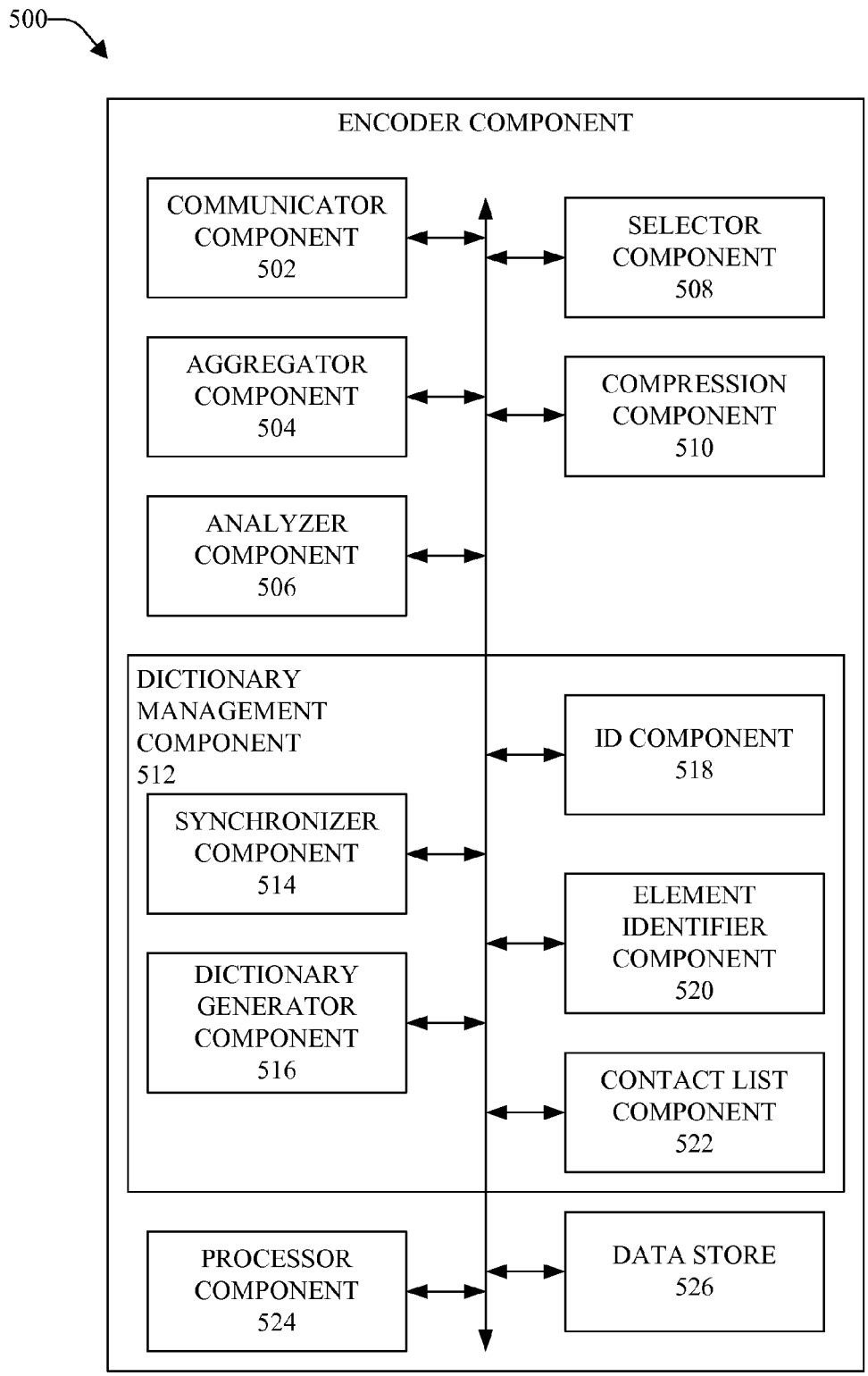
FIG. 5 presents a block diagram of an example encoder component in accordance with various aspects and implementations of this disclosure.

FIG. 5 illustrates a block diagram of an example encoder component 500 in accordance with various aspects and implementations of this disclosure. The encoder component 500 can be associated with a terminal that, at desired times, can be communicatively connected to another terminal to facilitate communication of video content between the terminals. The other terminal can include a decoder component that can decode encoded video content received from the encoder component 500 to facilitate display of the video content at the decoder end. In some implementations, the encoder component 500 can be part of a codec. The encoder component 500 can include a communicator component 502, an aggregator component 504, an analyzer component 506, a selector component 508, and compression component 510.

The communicator component 502 can be used to communicate (e.g., transmit, receive) information between the encoder component 500 and other components (e.g., terminal(s), decoder component(s), server(s), user interface(s), media source(s), media capture device(s), data store(s), etc.). The information can include, for example, video frames associated with a video session, information that can facilitate encoding data associated with video frames, information relating to defined coding criterion or corresponding rules, information relating to encoding parameters, encoding algorithms (e.g., based on sparse coding), etc. The encoder component 500 can use the information to facilitate encoding data (e.g., video frames). The communicator component 502 also can transmit encoded video frames (e.g., encoded video bitstream) to, for example, a decoder component or data store associated with the video session. In some implementations, the communicator component 502 can establish a secured communication channel, as more fully disclosed herein, to communicate information, such as messages relating to coding, dictionaries, reference video frames, etc., between the encoder component 500 and a decoder component in relation to a video session.

The aggregator component 504 can aggregate data received (e.g., obtained) from various entities (e.g., decoder component(s), terminal(s), server(s), media source(s), media capture device(s), processor(s), data store(s), compression component(s), dictionary management component(s), user interface(s), etc.). The aggregator component 504 can correlate respective items of data based at least in part on type of data, source of the data, time or date the data was generated or received, encoding state of the data, a video frame or coding unit to which the data relates, unique IDs of dictionaries, etc., to facilitate analyzing of the data by the analyzer component 506.

The analyzer component 506 can analyze data to facilitate encoding data, generating or modifying dictionaries or dictionary elements, identifying common dictionaries, selecting reference video frames for use in generating dictionary elements, etc., and can generate analysis results, based at least in part on the data analysis. For example, the analyzer component 506 can analyze information relating to dictionaries of the encoder component 500 and dictionaries of a decoder component at another end of a video session to facilitate identifying common dictionaries between the encoder component 500 and that decoder component, in accordance with defined coding criterion, as more fully described herein.

The analyzer component 506 can provide analysis results relating to the dictionaries of the encoder component 500 and the dictionaries of the decoder component at the other end to the dictionary management component 512. The dictionary management component 512 can identify dictionaries in common (e.g., common dictionaries) between the encoder component 500 and that decoder component, based at least in part on such analysis results.

The analyzer component 506 or an associated component (e.g., dictionary management component 512) also can identify candidate reference video frames that can be used to generate new dictionary elements for inclusion in a new common dictionary and/or an existing common dictionary, based at least in part on analysis results relating to selecting reference video frames, and/or generating or modifying dictionaries or dictionary elements. The encoder component 500 also can use the analysis results to facilitate enabling the compression component 510 to efficiently encode video frames of a video frame sequence (e.g., associated with a video session) using sparse coding and common dictionaries between the encoder component 500 and the decoder component at the other end of the video session.

The selector component 508 can select items of data, an applicable encoding-related algorithm (e.g., sparse coding compression algorithm, algorithm for selection of candidate reference video frames, etc.), encoding-related parameter values, or other information, to facilitate encoding data, etc. For example, the selector component 508 can select one or more parameters, one or more items of data, etc., relevant to an encoding task (e.g., identifying common dictionaries, selecting a reference video frame for use in generating a dictionary element, generating or modifying dictionaries or dictionary elements, etc.) being performed by the encoder component 500.

The encoder component 500 also can include a compression component 510 that can encode or compress data associated with a video frame in accordance with a defined encoding or compression algorithm. In some implementations, the compression component 510 can use a sparse coding algorithm in relation to using common dictionaries to encode data. During a video session associated with the encoder component 500 at one end of the session and a decoder component at the other end of the session, the compression component 510 can use common dictionaries between the encoder component 500 and the decoder component to encode digital media data associated with the video session for transmission to the decoder component. The compression component 510 also can use traditional compression algorithms in certain desired instances (e.g., when sparse coding is not desired for encoding data).

The encoder component 500 can include the dictionary management component 512. The dictionary management component 512 can efficiently control encoding (e.g., sparse coding) of video content, including using common dictionaries between the encoder component 500 and an associated decoder component (e.g., at another end of a video session) to facilitate such encoding, as more fully disclosed herein. The dictionary management component 512 can include, for example, a synchronizer component 514, a dictionary generator component 516, an ID component 518, an element identifier component 520, and a contact list component 522.

The synchronizer component 514 can synchronize and/or identify dictionaries and/or dictionary elements that are common between the encoder component 500 and a decoder component that are part of respective ends of a video session. The synchronizer component 514 (e.g., operating in conjunction with the analyzer component 506) can compare information (e.g., unique IDs) relating to dictionaries of the decoder component to information (e.g., unique IDs) relating to dictionaries of the encoder component 500. Based at least in part on the results of this comparison, the synchronizer component 514 can identify one or more dictionaries of the decoder component that correspond to (e.g., are identical to, match, and/or share a commonality with) one or more dictionaries of the encoder component 500. The synchronizer component 514 also can synchronize modification (e.g., addition of, elimination of, change to, etc., a dictionary element) of a dictionary, based at least in part on an update message(s) (e.g., synchronization or confirmation messages) relating to modification of a dictionary element to common dictionaries between the encoder component 500 and a decoder component at respective ends of a video session.

The dictionary generator component 516 can generate or modify (e.g., in conjunction with the synchronizer component 514) a dictionary, such as a dictionary of the encoder component 500 that corresponds to (e.g., shares a commonality with) a dictionary of a decoder component that can be at an opposite end of a video session from the encoder component 500. The dictionary generator component 516 can identify or select (e.g., as facilitated by the selector component 508) one or more reference video frames associated with a video session for use in generating new dictionary elements, based at least in part on a unique frame ID associated with each video frame, and frame IDs received from the decoder component associated with the session, as more fully disclosed herein. The dictionary generator component 516 can generate and add one or more new dictionary elements to a new or existing dictionary based at least in part on one or more selected reference video frames of a video session between the terminal on the side of the encoder component 500 and a terminal on the decoder side.

The ID component 518 can generate and/or assign respective unique identifiers to respective dictionaries to facilitate distinguishing between the different dictionaries, and selecting a desired common dictionary for use in a video session. In some implementations, the ID component 518 also can identify one or more video frames of the video session on the encoder side to be selected as a reference video frame(s), based at least in part on a frame ID received from the decoder component at the other end of the session. The dictionary generator component 516 can use the reference video frame(s) to generate a dictionary element(s) for inclusion in a dictionary. The frame ID can be associated with a corresponding video frame selected by the decoder component.

The dictionary generator component 516 can operate in conjunction with the ID component 518 to select the one or more reference video frames associated with a video session for use in generating dictionary elements, based at least in part on one or more frame IDs received from the decoder component associated with the video session, and the respective frame IDs associated with the video frames.

The element identifier component 520 can identify information in and/or extract information from one or more reference video frames associated with a video session to generate one or more dictionary elements that can be added to a new or existing dictionary of the encoder component 500 that can correspond to (e.g., can be a dictionary in common with) a dictionary of a decoder component at the other end of the video session. The element identifier component 520 (e.g., operating in conjunction with the dictionary generator component 516) can use, for example, a training algorithm to generate dictionary elements that can be used to facilitate sparse coding of video content. The dictionary generator component 516 can add the dictionary elements to the dictionary for use in subsequent video communications between the encoder component 500 and the decoder component at the other end of a video session (e.g., current or subsequent video session). The dictionary (e.g., dictionary in common with a corresponding dictionary of the decoder component) can facilitate efficient encoding (e.g., sparse coding) of video content and transmission of the encoded video content between the encoder component 500 and the decoder component on the other side of the video session.

The contact list component 522 can generate and maintain a contact list of one or more other users, or associated terminals, associated codecs, associated communication addresses, or other information, respectively relating to such other users. The contact list component 522 (e.g., via the communicator component 502) can provide the contact list, or updates to the contact list, to a server (e.g., centralized server) or other component to facilitate distribution of dictionaries to all or at least some users on the contact list in accordance with user preferences of the user. In some implementations, there can be more than one contact list for a particular user, with each contact list having different user preferences associated therewith to facilitate controlling the distribution of dictionaries to other users contained on the respective contact lists.

In some implementations, the encoder component 500 also can include a processor component 524 that can operate with the other components (e.g., communicator component 502, aggregator component 504, analyzer component 506, etc.) to facilitate performing the various functions of the encoder component 500. The processor component 524 can employ one or more processors, microprocessors, or controllers that can process data, such as information relating to encoding data, information relating to other operations of the encoder component 500, and/or other information, etc., to facilitate encoding video content and/or performing other operations associated with the encoder component 500, as more fully disclosed herein. The processor component 524 can control or manage data flow between the encoder component 500 and other components (e.g., media source, media capture device, decoder component, data store, computer-readable storage media, etc.) associated with the encoder component 500.

The encoder component 500 also can include a data store 526 that can store data structures (e.g., user data, video content, metadata), instructions, procedures, and/or code structure(s) (e.g., modules, objects, hashes, classes) to facilitate performing or controlling operations associated with the encoder component 500. The data store 526 also can store information (e.g., encoding-related algorithms, dictionaries associated with sparse coding, unique IDs, encoding parameters, contact lists, coding criterion, etc.) relating to encoding data, and/or information relating to other operations of the encoder component 500, etc., to facilitate encoding video content, and performing or controlling operations, associated with the encoder component 500. The processor component 524 can be coupled (e.g., through a memory bus) to the data store 526 in order to store and retrieve information desired to operate and/or confer functionality, at least in part, to the components (e.g., communicator component 502, aggregator component 504, analyzer component 506, etc.) of the encoder component 500, and/or substantially any other operational aspects of the encoder component 500.

Figure 6:
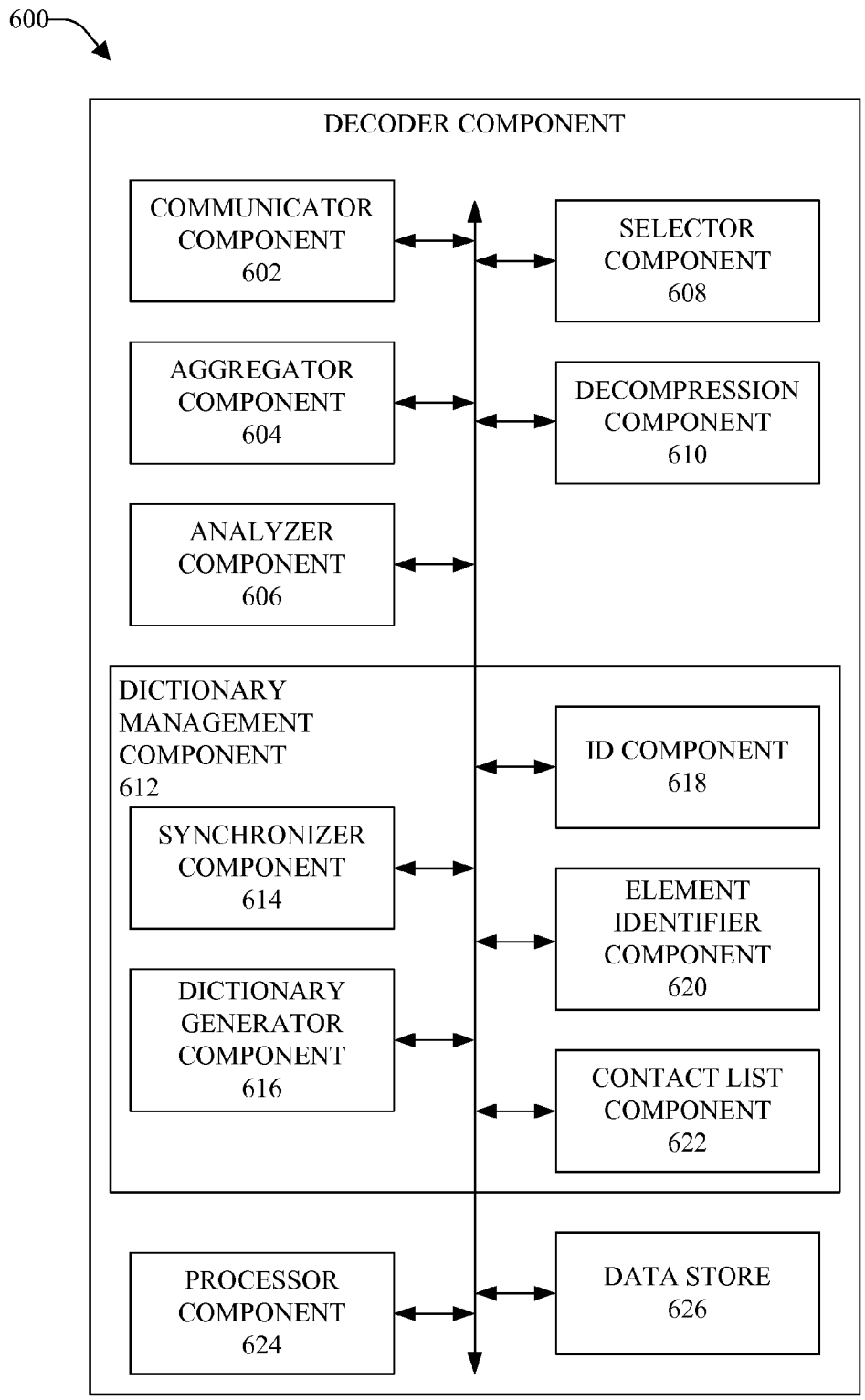
FIG. 6 depicts a block diagram of an example decoder component in accordance with various aspects and implementations of this disclosure.

FIG. 6 depicts a block diagram of an example decoder component 600 in accordance with various aspects and implementations of this disclosure. The decoder component 600 can include a communicator component 602, an aggregator component 604, an analyzer component 606, a selector component 608, and a decompression component 610.

The communicator component 602 can communicate (e.g., transmit, receive) information between the decoder component 600 and other components (e.g., terminal(s), encoder component(s), server(s), user interface(s), data store(s), etc.). The information can include, for example, video frames associated with a video session, information that can facilitate decoding and reconstructing data associated with video frames, information relating to defined coding criterion or corresponding rules, information relating to decoding parameters, decoding algorithms (e.g., based on sparse decoding), etc. The decoder component 600 can use the information to facilitate enabling the decoder component 600 to decode and reconstruct data. During a video session, the communicator component 602 can receive encoded video frames (e.g., encoded video bitstream) from, for example, an encoder component or data store associated with the video session. In some implementations, the communicator component 602 can establish a secured communication channel, as more fully disclosed herein, to communicate information, such as messages relating to coding, dictionaries, frame IDs associated with selected reference video frames, etc., between the decoder component 600 and an encoder component in relation to a video session.

The aggregator component 604 can aggregate data received (e.g., obtained) from various entities (e.g., encoder component(s), terminal(s), server(s), processor(s), data store(s), decompression component(s), dictionary management component(s), user interface(s), etc.). The aggregator component 604 can correlate respective items of data based at least in part on type of data, source of the data, time or date the data was generated or received, decoding state of the data, a video frame or coding unit to which the data relates, unique IDs of dictionaries, etc., to facilitate analyzing of the data by the analyzer component 606.

The analyzer component 606 can analyze data to facilitate decoding data, generating or modifying dictionaries or dictionary elements, identifying common dictionaries, selecting reference video frames for use in generating dictionary elements, etc., and can generate analysis results, based at least in part on the data analysis. For example, the analyzer component 606 can analyze information relating to dictionaries of the decoder component 600 and dictionaries of an encoder component at the other end of the video session to facilitate identifying common dictionaries between the decoder component 600 and that encoder component, in accordance with defined coding criterion, as more fully described herein.

The analyzer component 606 can provide analysis results relating to the dictionaries of the decoder component 600 and the dictionaries of the encoder component to the dictionary management component 612. The dictionary management component 612 can identify dictionaries in common (e.g., common dictionaries) between the decoder component 600 and the encoder component, based at least in part on such analysis results.

The analyzer component 606 or an associated component (e.g., dictionary management component 612) also can identify candidate reference video frames for use in generating dictionary elements, and/or generate or modify a dictionary, based at least in part on analysis results relating to selecting reference video frames and/or generating or modifying dictionaries or dictionary elements. The decoder component 600 also can use the analysis results to facilitate enabling the decompression component 610 to efficiently decode video frames of a video frame sequence (e.g., associated with a video session) using sparse coding and common dictionaries between the decoder component 600 and the encoder component at the other end of the video session.

The selector component 608 can select items of data, an applicable decoding-related algorithm (e.g., decompression (e.g., sparse coding) algorithm, algorithm for selection of candidate reference video frames, etc.), decoding-related parameter values, or other information, to facilitate decoding data, etc. For example, the selector component 608 can select one or more parameters, one or more items of data, etc., relevant to a decoding task (e.g., identifying common dictionaries, selecting a reference video frame for use in generating a dictionary element, generating or modifying dictionaries or dictionary elements, etc.) being performed by the decoder component 600.

The decoder component 600 can include a decompression component 610 that can decode or decompress data associated with an encoded video frame in accordance with a defined decoding or decompression algorithm. In some implementations, the decompression component 610 can use a sparse coding algorithm in relation to using common dictionaries to decode data. In certain implementations, during a video session associated with the decoder component 600 and the encoder component, the decompression component 610 can use common dictionaries between the decoder component 600 and encoder component to decode encoded video content associated with the video session and reconstruct the video content (e.g. for presentation to a viewer). The decompression component 610 also can use traditional decompression algorithms in some instances (e.g., when sparse coding is not desired for decoding encoded data).

The decoder component 600 can include the dictionary management component 612. The dictionary management component 612 can efficiently control decoding of encoded video content, including using common dictionaries between the decoder component 600 and an associated encoder component (e.g., at the other end of the video session) to facilitate such decoding, as more fully disclosed herein. The dictionary management component 612 can include, for example, a synchronizer component 614, a dictionary generator component 616, an ID component 618, an element identifier component 620, and a contact list component 622.

The synchronizer component 614 can synchronize and/or identify dictionaries and/or dictionary elements that are common between the decoder component 600 and the encoder component that are part of respective ends of the video session. The synchronizer component 614 (e.g., operating in conjunction with the analyzer component 606) can compare information (e.g., unique IDs) relating to dictionaries of the encoder component to information (e.g., unique IDs) relating to dictionaries of the decoder component 600. Based at least in part on the results of this comparison, the synchronizer component 614 can identify one or more dictionaries of the encoder component that correspond to (e.g., are identical to, match, and/or share a commonality with) to one or more dictionaries of the decoder component 600. The synchronizer component 614 also can synchronize modification (e.g., addition of, elimination of, change to, etc., a dictionary element) of a dictionary, based at least in part on an update message(s) (e.g., synchronization or confirmation messages) relating to modification of a dictionary element to common dictionaries between the decoder component 600 and the encoder component.

The dictionary generator component 616 can generate or modify (e.g., in conjunction with the synchronizer component 614) a dictionary, such as a dictionary of the decoder component 600 that can correspond to (e.g., can share a commonality with) a dictionary of an encoder component, which can be at the opposite end of a video session from the decoder component 600. The dictionary generator component 616 can identify or select (e.g., as facilitated by the selector component 608) one or more reference video frames associated with a video session for use in generating new dictionary elements for inclusion in a desired (e.g., common) dictionary, in accordance with defined coding criterion (e.g., used to determine which video frames to select as reference video frames), as more fully disclosed herein. The dictionary generator component 616 can generate and add one or more new dictionary elements to a new or existing dictionary based at least in part on one or more selected reference video frames of a video session between the terminal on the side of the decoder component 600 and a terminal on the encoder side.

The ID component 618 can generate and/or assign respective unique identifiers to respective dictionaries to facilitate distinguishing between the different dictionaries, and selecting a desired common dictionary for use in a video session. In some implementations, the ID component 618 can generate or identify a frame ID that can be associated with a video frame, such as a video frame selected as a reference video frame, of a video session.

The element identifier component 620 can identify information in and/or extract information from one or more reference video frames associated with a video session to generate one or more dictionary elements that can be added to a new or existing dictionary of the decoder component 600 that can correspond to (e.g., can be a dictionary in common with) a dictionary of the encoder component at the other end of the video session. The element identifier component 620 (e.g., operating in conjunction with the dictionary generator component 616) can use, for example, a training algorithm to generate dictionary elements that can be used to facilitate sparse coding of video content. The dictionary generator component 616 can add the dictionary elements to the dictionary for use in subsequent video communications between the decoder component 600 and the encoder component at the other end of a video session (e.g., current or subsequent video session). The dictionary (e.g., dictionary in common with a corresponding dictionary of the encoder component) can facilitate efficient decoding (e.g., sparse coding) and reconstructing of video content.

The contact list component 622 can generate and maintain a contact list of one or more other users, or associated terminals, associated codecs, associated communication addresses, or other information, respectively relating to such other users. The contact list component 622 (e.g., via the communicator component 602) can provide the contact list, or updates to the contact list, to a server (e.g., centralized server) or other component to facilitate distribution of dictionaries to all or at least some users on the contact list in accordance with user preferences of the user. In some implementations, there can be more than one contact list for a particular user, with each contact list having different user preferences associated therewith to facilitate controlling the distribution of dictionaries to other users contained on the respective contact lists.

The decoder component 600 can include a processor component 624 that can operate in conjunction with the other components (e.g., communicator component 602, aggregator component 604, analyzer component 606, etc.) to facilitate performing the various functions of the decoder component 600, as more fully disclosed herein. The processor component 624 can employ one or more processors, microprocessors, or controllers that can process data, such as information relating to decoding data, information relating to other operations of the decoder component 600, and/or other information, etc., to facilitate decoding encoded video content and/or performing other operations associated with the decoder component 600, as more fully disclosed herein. The processor component 624 also can control or manage data flow between the decoder component 600 and other components (e.g., encoder component, data store, computer-readable storage media, display component, etc.) associated with the decoder component 600.

The decoder component 600 also can include a data store 626 that can store data structures (e.g., user data, metadata), instructions, procedures, and/or code structure(s) (e.g., modules, objects, hashes, classes) to facilitate performing or controlling operations associated with the decoder component 600. The data store 626 also can store information (e.g., decoding-related algorithms, coding modes, decoding parameters, contact lists, coding criterion, etc.) relating to decoding data and other information relating to other operations of the decoder component 600, to facilitate decoding video content, and performing or controlling operations, associated with the decoder component 600. The processor component 624 can be coupled (e.g., through a memory bus) to the data store 626 in order to store and retrieve information desired to operate and/or confer functionality, at least in part, to the components (e.g., communicator component 602, aggregator component 604, analyzer component 606, etc.) of the decoder component 600, and/or substantially any other operational aspects of the decoder component 600.

The encoder component 500 and decoder component 600 have been described herein to have respective dictionary management components (e.g., 512, 512), communicator components (e.g., 502, 602), aggregator components (e.g., 504, 604), etc. In some implementations, an encoder component (e.g., 500) and a decoder component (e.g., 600) can be part of a same codec or system, and can share (e.g., be coupled to) the same dictionary management component and/or another component(s) (e.g., communicator component, aggregator component, analyzer component, processor component, data store, etc.).

Figure 7:
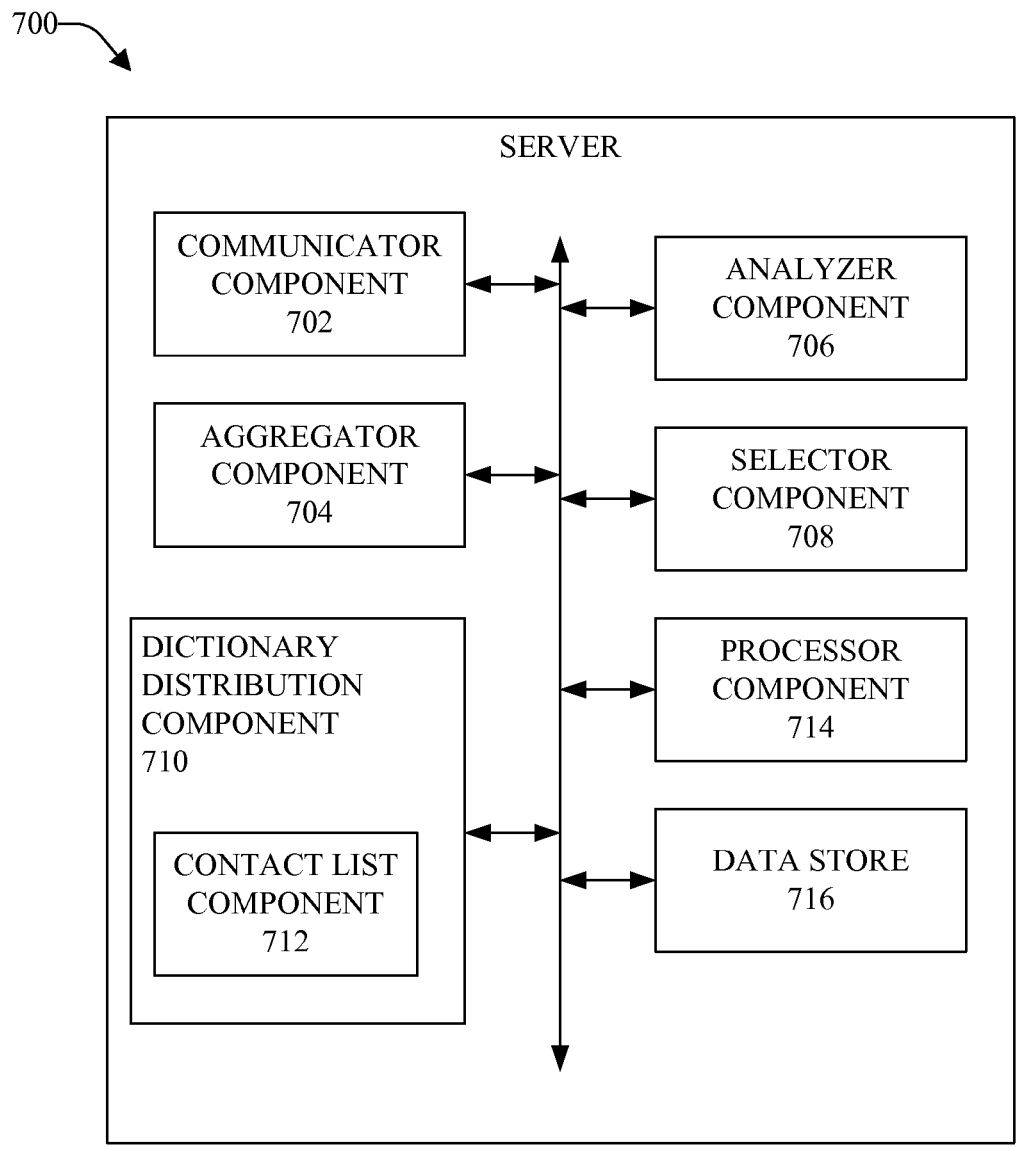
FIG. 7 presents a block diagram of an example server in accordance with various aspects and implementations of this disclosure.

FIG. 7 presents a block diagram of an example server 700 in accordance with various aspects and implementations of this disclosure. The server 700 can include a communicator component 702, an aggregator component 704, an analyzer component 706, and a selector component 708.

The communicator component 702 can be used to communicate (e.g., transmit, receive) information between the server 700 and other components (e.g., terminal(s), encoder component(s), decoder component(s), user interface(s), data store(s), etc.). The information can include, for example, contact lists of respective users and information relating to contacts (e.g., users) contained in a contact list, dictionaries (e.g., sparse coding dictionaries), dictionary updates, meeting requests for communication sessions, responses to meeting requests, etc. The server 700 can use some of the information (e.g., contact lists, meeting requests or responses thereto) to facilitate providing dictionaries to various users or associated devices (e.g., terminal(s), codec(s), etc.), such as users or associated devices listed in a contact list of a particular user. For example, in response to the server 700 receiving a set of dictionaries uploaded from a device (e.g., terminal, codec) of a particular user, the communicator component 702 can transmit (e.g., automatically push) the set of dictionaries to devices or communication addresses associated with users contained in a contact list of the particular user. In some implementations, the communicator component 702 can establish a secured communication channel to communicate information, such as dictionaries, meeting requests, responses to meeting requests, other types of messages, etc., between the server 700 and other devices (e.g., terminal(s), server(s) (e.g., email server(s)), codec(s), etc.).

The aggregator component 704 can aggregate data received (e.g., obtained) from various entities (e.g., encoder component(s), decoder component(s), server(s) (e.g., email server(s)), processor(s), data store(s), compression component(s), dictionary management component(s), user interface(s), etc.). The aggregator component 704 can correlate respective items of data based at least in part on type of data, source of the data, time or date the data was generated or received, unique IDs associated with dictionaries, etc., to facilitate analyzing of the data by the analyzer component 706 or performing other operation on the data.

The analyzer component 706 can analyze data to facilitate identifying a set of dictionaries to be sent to a contact (e.g., user on a contact list), distributing a set of dictionaries, etc., and can generate analysis results, based at least in part on the data analysis. For example, when a set of dictionaries associated with a particular user is received by the server 700, the analyzer component 706 can analyze information stored in a contact list associated with a particular user to identify users on the contact list to which the set of dictionaries is to be sent. The analyzer component 706 also can analyze information (e.g., unique IDs) associated with dictionaries to facilitate identifying dictionaries that are to be provided to respective users. For instance, certain users on the contact list may have video sessions with the particular user while the particular user is in one location (e.g., home), while other users on the contact list may have video sessions with the particular user while the particular user is in another location (e.g., office at work). The analyzer component 706 can identify the location (e.g., home) associated with the set of dictionaries and identify users on the contact list associated with that identified location. The server 700 can transmit the set of dictionaries or notification of availability of the set of dictionaries to those users on the contact list that are associated with the identified location (e.g., based on a user preference to only send dictionaries to contacts associated with a particular location associated with those dictionaries). The analyzer component 706 can provide analysis results relating to the dictionaries and/or contact list to the dictionary distribution component 710 for further processing (e.g., dictionary distribution determinations, notifications, etc.).

The selector component 708 can select items of data (e.g., contact list or information stored therein, dictionaries, unique IDs, communication addresses, etc.), parameter values, or other information, to facilitate distributing dictionaries or notifications to users or associated devices in relation to dictionaries. For example, the selector component 708 can select a subset of communication addresses contained in a contact list associated with a particular user, and select a set of dictionaries associated with the particular user from the data store 716, to facilitate transmitting the set of dictionaries associated with the particular user to the subset of communication addresses.

The server 700 also can include a dictionary distribution component 710 that can manage (e.g., control) distribution of dictionaries or notifications relating to dictionaries to respective users or associated devices (e.g., communication device, such as a terminal), in accordance with a defined distribution criterion(s), user preferences of users, contact lists of users, etc. The dictionary distribution component 710 can determine which contacts on a contact list of a user are to be sent (e.g., automatically) a set of dictionaries or notification relating to the set of dictionaries, for example, in response to the set of dictionaries being uploaded to the server 700 by the user (e.g., by a device associated with the user), in accordance with the defined distribution criterion(s) and/or user preferences of the user. This determination by the dictionary distribution component 710 can be based at least in part on the analysis results obtained from the analyzer component 706. The dictionary distribution component 710 also can control operations of other components (e.g., communicator component 702, aggregator component 704, analyzer component 706, etc.) to facilitate distribution of dictionaries or notifications relating to dictionaries to respective users or associated devices.

The dictionary distribution component 710 can include a contact list component 712 that can facilitate generating, maintaining, and/or updating contact lists of respective users. The contact lists can be stored in or retrieved from the data store 716. A contact list can include various types of information, including the name of the user associated with the contact list, communication address(es) associated the user, communication addresses of contacts to whom the user may desire to have dictionaries sent, unique IDs of dictionaries (e.g., dictionaries a contact has obtained), user location(s) associated with contacts, user preferences, etc.

The server 700 can include a processor component 714 that can operate in conjunction with the other components (e.g., communicator component 702, aggregator component 704, analyzer component 706, etc.) to facilitate performing the various functions of the server 700, as more fully disclosed herein. The processor component 714 can employ one or more processors, microprocessors, or controllers that can process data, such as information relating to distributing dictionaries (e.g., to terminals, codecs, communication addresses, etc.), information relating to contact lists, information relating to meeting requests (e.g., for video conference sessions), information relating to other operations of the server 700, etc. This processing of data by the processor component 714 can facilitate distributing dictionaries to desired destinations or recipients, and/or performing other operations associated with the server 700, as more fully disclosed herein. The processor component 714 also can control or manage data flow between the server 700 and other components (e.g., terminal, server (e.g., email server), codec, encoder component, decoder component, data store, computer-readable storage media, display component, etc.) associated with the server 700.

The server 700 also can include a data store 716 that can store data structures (e.g., user data, metadata), instructions, procedures, and/or code structure(s) (e.g., modules, objects, hashes, classes) to facilitate performing or controlling operations associated with the server 700. The data store 716 also can store information (e.g., dictionaries, contact lists, user profiles, user preferences, etc.) relating to maintaining or distributing dictionaries, and other information relating to other operations of the server 700, to facilitate maintaining or distributing dictionaries, managing contact lists, and performing or controlling operations, associated with the server 700. The processor component 714 can be coupled (e.g., through a memory bus) to the data store 716 in order to store and retrieve information desired to operate and/or confer functionality, at least in part, to the components (e.g., communicator component 702, aggregator component 704, analyzer component 706, etc.) of the server 700, and/or substantially any other operational aspects of the server 700.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
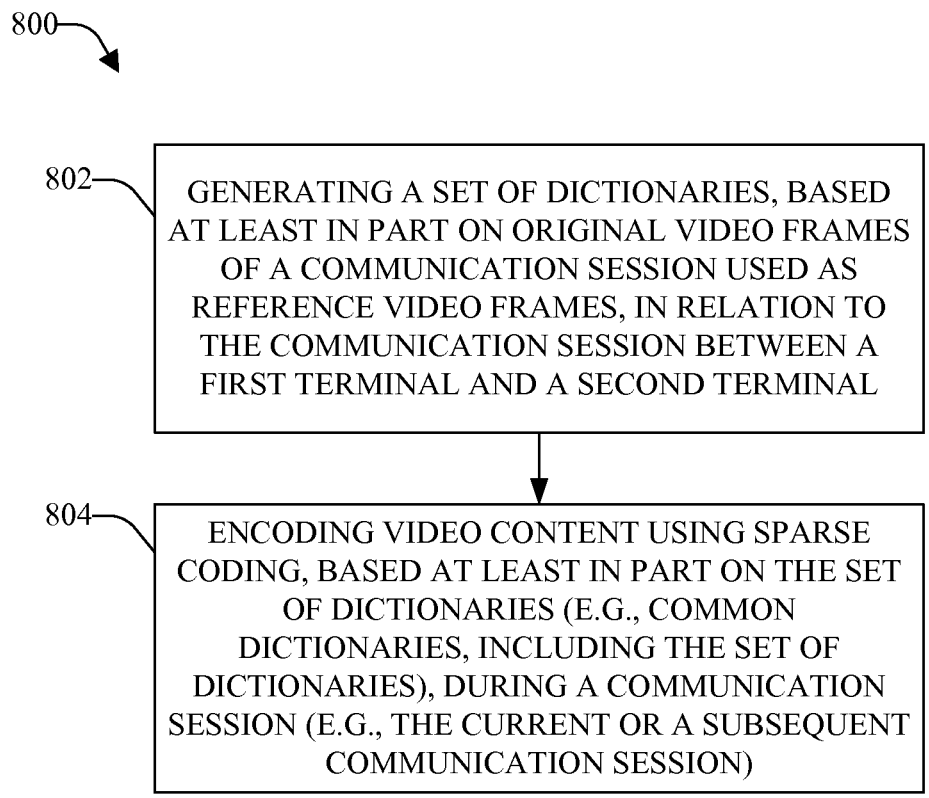
FIG. 8 depicts a flow chart of an example method for generating a set of dictionaries (e.g., custom sparse coding dictionaries) to facilitate efficiently coding (e.g., using sparse coding) video content using the set of dictionaries, in accordance with various aspects and implementations of this disclosure.
Figure 9:
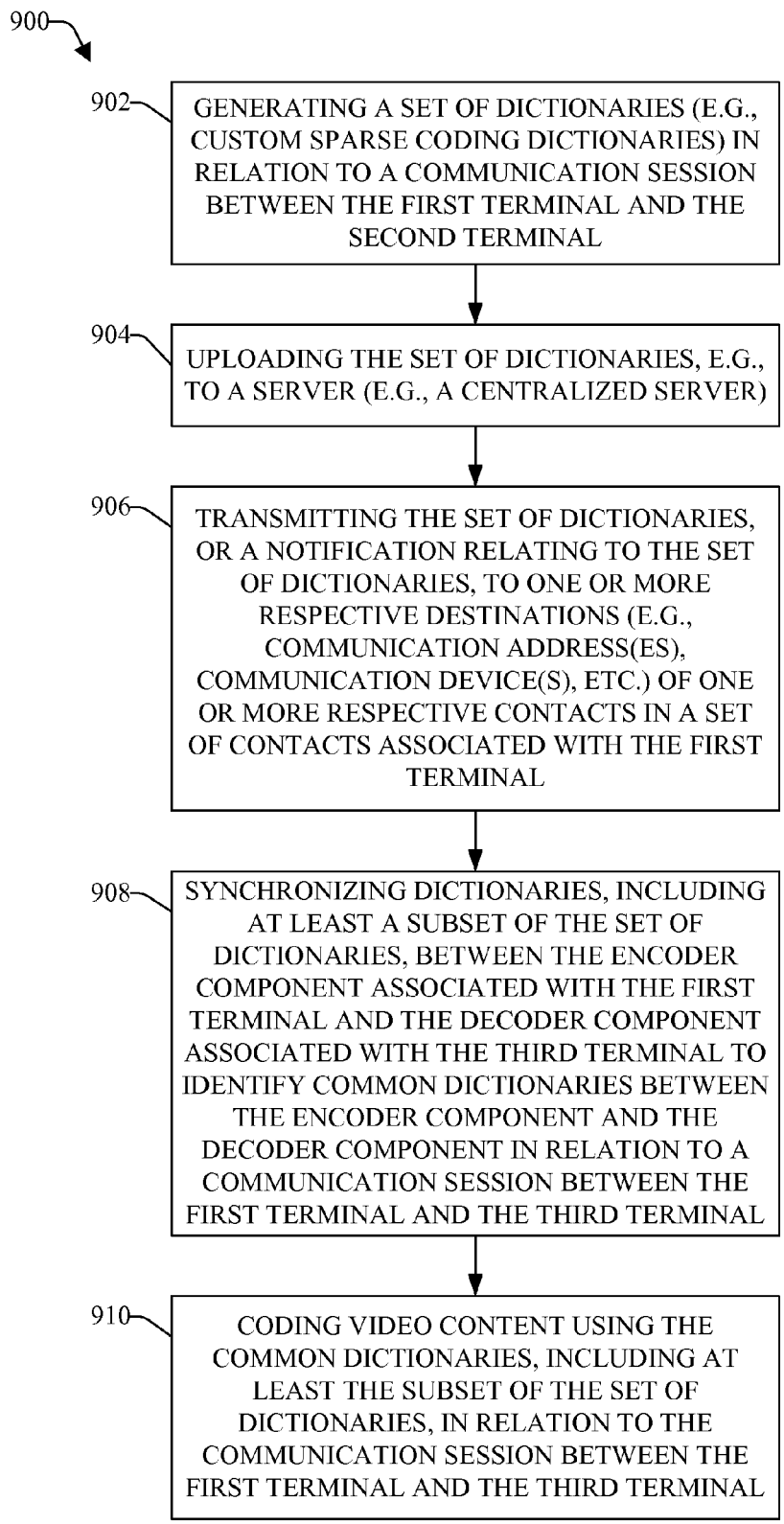
FIG. 9 illustrates a flow chart of an example method for using a set of dictionaries, which were generated in relation to a communication session between a first terminal and a second terminal, during a subsequent communication session between the first terminal and a third terminal.

In view of the example systems, components, and devices described above, example methods that can be implemented in accordance with this disclosure can be further appreciated with reference to flowcharts in FIGS. 8-9. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

With reference first to FIG. 8, illustrated is a flow chart of an example method for generating a set of dictionaries (e.g., custom sparse coding dictionaries) to facilitate efficiently coding (e.g., using sparse coding) video content using the set of dictionaries, in accordance with various aspects and implementations of this disclosure. The method 800 can be used, for example, by an encoder component, which can include a dictionary management component.

At 802, a set of dictionaries (e.g., custom sparse coding dictionaries) can be generated, based at least in part on original video frames of a communication session used as reference video frames, in relation to the communication session between a first terminal and a second terminal. The first terminal (e.g., communication device, such as a computer or mobile phone) can be at a first location (e.g., a room, an office, a physical area, a geographical location, etc.) and the second terminal can be at a second location at respective ends of the communication session (e.g., video conference session).

The encoder component associated with the first terminal and a decoder component associated with the second terminal each can have a dictionary management component. The respective dictionary management components associated with the first terminal and the second terminal can generate a set of dictionaries (e.g., custom sparse coding dictionaries) that can be used to facilitate coding video content associated with the first terminal and another terminal, such as the second terminal, a third terminal, or some other terminal, during respective communication sessions. For instance, the dictionary management component of the encoder component can generate dictionary elements based at least in part on original video frames of the session that can be used as reference video frames to facilitate generating dictionary elements. The dictionary management component can generate the set of dictionaries with each dictionary containing respective dictionary elements.

The respective dictionary management components of the encoder component and decoder component also can generate unique IDs that can be respectively associated with the dictionaries in the set. A dictionary management component can generate unique values for the unique IDs based at least in part on the terminal addresses of the first and/or second terminals, a dictionary sub-ID, and/or the respective locations associated with the first and second terminals. The encoder component associated with the first terminal can share and/or upload this set of dictionaries (e.g., to a centralized server) to facilitate making the set of dictionaries available to contacts associated with the first terminal or an associated user, as more fully disclosed herein.

Similarly, the decoder component associated with the first terminal and the encoder component associated with the second terminal each can use a dictionary management component to facilitate generating dictionary elements and dictionaries. These dictionary management components respectively associated with the first terminal and the second terminal can generate another set of dictionaries (e.g., custom sparse coding dictionaries) that can be used to facilitate coding video content associated with the second terminal and another terminal, such as the first terminal, a third terminal, or some other terminal, during respective communication sessions. For example, the encoder component associated with the second terminal can share and/or upload this other set of dictionaries to facilitate making this other set of dictionaries available to contacts associated with the second terminal or an associated user.

In some implementations, the encoder component and decoder component of a first codec associated with the first terminal can share a single dictionary management component, and/or the encoder component and decoder component of a second codec associated with the second terminal can share a single dictionary management component. In other implementations, the encoder component and decoder component of the first codec can each have their own dictionary management component, and/or the encoder component and decoder component of the second codec can each have their own dictionary management component.

At 804, video content can be encoded using sparse coding, based at least in part on the set of dictionaries (e.g., common dictionaries, including the set of dictionaries), during a communication session (e.g., the current or a subsequent communication session). The encoder component can use the set of dictionaries to encode the video content using sparse coding, for example, during a communication session between the first terminal and the second terminal, or between the first terminal and another (e.g., third) terminal. The encoder component associated with the first terminal can transmit the encoded video content to the decoder component at the far-end (e.g., second or third) terminal. The decoder component at the far end can use the corresponding (e.g., decoder-side) dictionary(ies) from the set of dictionaries to decode and reconstruct the encoded video content. The reconstructed video content can be provided to the display component of the far-end terminal for presentation to a user viewing the far-end terminal.

In some implementations, the dictionary management component of the encoder component can provide the set of dictionaries, for example, to another decoder component or a centralized server, to facilitate making the set of dictionaries available for use in coding of video content in a subsequent communication session between the first terminal and the second terminal, and/or between the first terminal or another (e.g., third) terminal. For example, the dictionary management component can upload the set of dictionaries to a centralized server. The centralized server can store the set of dictionaries, and also can transmit the set of dictionaries to one or more contacts (e.g., to devices or communication addresses associated with the contact(s)) on a contact list associated with the first terminal (e.g., a first user associated with the first terminal).

During a subsequent communication session between the first terminal (e.g., at the same location) and a third terminal (e.g., associated with a contact on the contact list), the dictionary management components of the first terminal and third terminal can synchronize with each other to identify common dictionaries, including the set of dictionaries, between the first and third terminals based at least in part on the unique IDs of the dictionaries. The encoder component of the first terminal can encode the video content based at least in part on the set of dictionaries (and/or other common dictionaries). The encoder component or another component (e.g., first terminal) can transmit the encoded video content to the third terminal. The decoder component associated with the third terminal can decode the encoded video content and reconstruct the video content, based at least in part on the set of dictionaries (e.g., sparse coding dictionaries). The decoder component can provide the reconstructed video content to the third terminal for display by the terminal.

Referring next to FIG. 9, depicted is a flow chart of an example method 900 for using a set of dictionaries, which were generated in relation to a communication session between a first terminal and a second terminal, during a subsequent communication session between the first terminal and a third terminal. The method 900 can be used, for example, by an encoder component, which can include a dictionary management component, associated with the first terminal. Some aspects of the method 900 also can be implemented by a server (e.g., a centralized server).

At 902, a set of dictionaries (e.g., custom sparse coding dictionaries) can be generated in relation to a communication session between the first terminal and the second terminal. The first terminal can be at a first location and the second terminal can be at a second location at respective ends of the communication session (e.g., video conference session). The encoder component associated with the first terminal and a decoder component associated with the second terminal each can have a dictionary management component. The respective dictionary management components associated with the first terminal and second terminal can generate a set of dictionaries (e.g., custom sparse coding dictionaries) that can be used to facilitate coding video content associated with the first terminal and at least one of the second terminal or one or more other terminals, such as a third terminal. For example, the dictionary management component associated with the encoder component can generate the set of dictionaries, based at least in part on original video frames of a communication session used as reference video frames, as more fully disclosed herein. In some implementations, the respective dictionary management components can generate the set of dictionaries during (e.g., dynamically) or after (e.g., while offline) the communication session. The dictionary management component of the encoder component associated with the first terminal can assign each dictionary in the set of dictionaries a unique ID based at least in part on the terminal address of the first terminal, the particular dictionary, and/or the location associated with the first terminal.

At 904, the set of dictionaries can be uploaded, for example, to a server (e.g., a centralized server). The dictionary management component of the encoder component can upload the set of dictionaries to the server to facilitate distribution of the set of dictionaries to other terminals (and associated codecs) associated with the user associated with the first terminal.

At 906, the set of dictionaries, or a notification relating to the set of dictionaries, can be transmitted to one or more respective destinations (e.g., communication address(es), communication device(s), etc.) of one or more respective contacts in a set of contacts associated with the first terminal. For example, one of the contacts in the set of contacts can be a user associated with the third terminal. The dictionary management component of the encoder component, first terminal, or the server can transmit the set of dictionaries or the notification to a destination(s) (e.g., a communication address, a codec, etc.) associated with the third terminal. If a notification message is sent, the notification message can indicate that the set of dictionaries are available to the third terminal (or respectively associated third codec). In some implementations, the notification also can include the set of dictionaries. For example, the server can automatically transmit (e.g., push) the set of dictionaries, with or as the notification, to a destination(s) associated with the third terminal and/or other destinations identified on the set of contacts associated with the first terminal. In other implementations, if, for instance, a notification was sent without the dictionaries, the dictionary management component associated with the third codec and third terminal can access the server to obtain the set of dictionaries or can receive the set of dictionaries from the first terminal or associated encoder component.

At 908, dictionaries, including at least a subset of the set of dictionaries, can be synchronized between the encoder component associated with the first terminal and the decoder component associated with the third terminal to identify common dictionaries between the encoder component and the decoder component in relation to a communication session between the first terminal and the third terminal. During a communication session between the first terminal (e.g., from the first location) and the third terminal (e.g., from the third location), the encoder component and the decoder component, using their respective dictionary management components, can signal each other to synchronize dictionaries in common between the encoder component and the decoder component. The encoder component and the decoder component, using their respective dictionary management components, can exchange information regarding dictionaries respectively maintained by the encoder component and decoder component.

The encoder component and decoder component, using their respective dictionary management components, can synchronize dictionaries by identifying dictionaries, such as all or at least some dictionaries of the set of dictionaries, in common between the encoder component and the decoder component based at least in part on respective unique IDs associated with respective dictionaries. If the decoder component associated with the third terminal was unable to obtain all of the dictionaries in the set of dictionaries, the respective dictionary management components of the encoder component and decoder component can negotiate to identify common dictionaries, including a subset of dictionaries of the set of dictionaries, and the subset of dictionaries can be used to facilitate coding video content during the communication session.

At 910, video content can be coded using the common dictionaries, including at least the subset of the set of dictionaries, in relation to the communication session between the first terminal and the third terminal. During the communication session, the encoder component and the decoder component can use the common dictionaries, including at least some dictionaries of the set of dictionaries, to facilitate coding video content (e.g., using sparse coding) communicated between the encoder component associated with the first terminal and the decoder component associated with the third terminal. The decoder component can use the common dictionaries to efficiently decode and reconstruct the encoded video content. The decoder component can communicate the reconstructed video content to a display component of the third terminal associated with the decoder component. The display component can present (e.g., display) the reconstructed video content to a user.

During the communication session between the first terminal and the third terminal, the respective dictionary management components of the encoder component associated with the first terminal and the decoder component associated with the third terminal can generate new dictionary elements, update existing dictionaries in the set, and/or generate new dictionaries that can be included in the set of dictionaries, as more fully disclosed herein. The new dictionary elements, updated dictionaries, or new dictionaries obtained from this communication session can be uploaded and shared with desired contacts (e.g., associated with the first terminal), for example, in accordance with the operations disclosed at reference numerals 904 and 906 and/or as otherwise disclosed herein.

Figure 10:
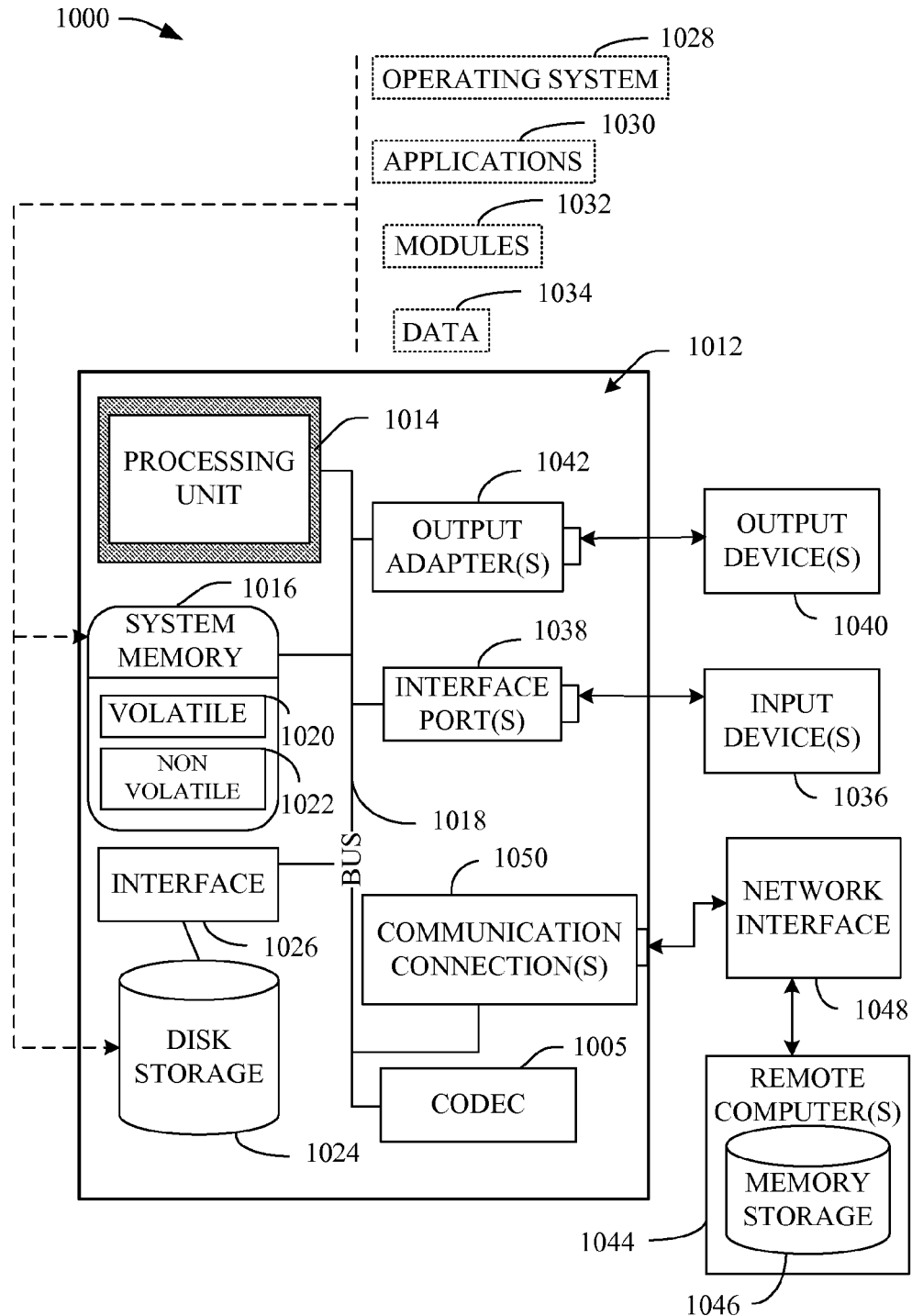
FIG. 10 is a schematic block diagram illustrating a suitable operating environment.
Figure 11:
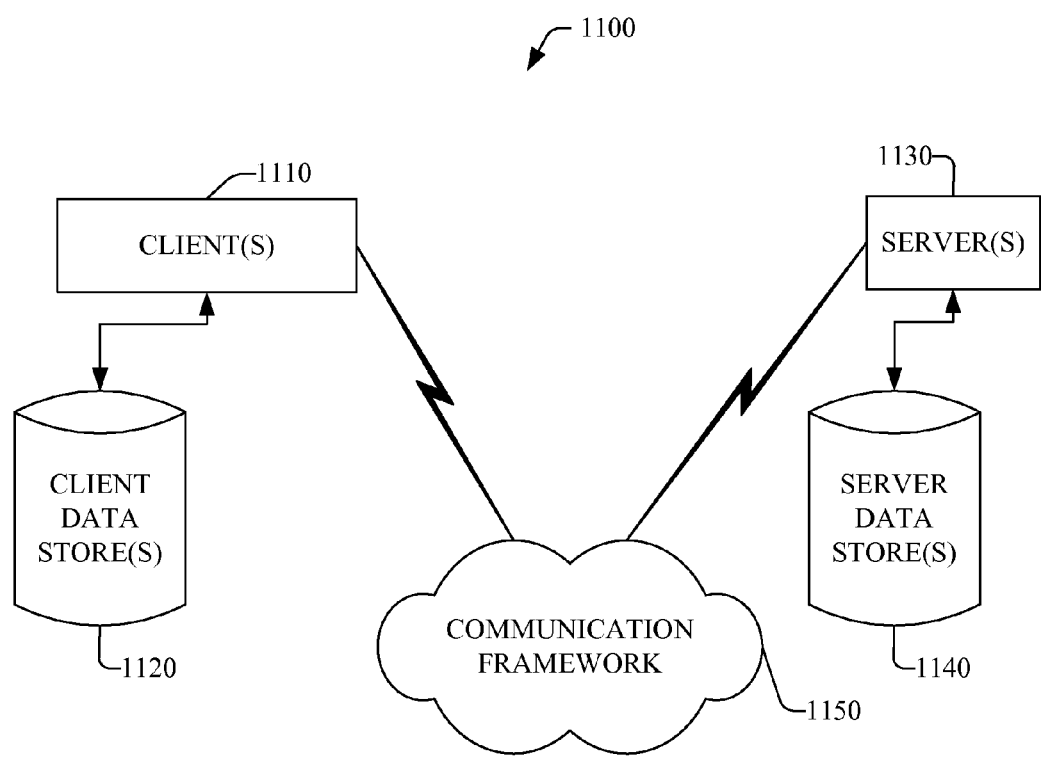
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. With reference to FIG. 10, a suitable operating environment 1000 for implementing various aspects of this disclosure includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/nonvolatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

In accordance with various aspects and implementations, the computer 1012 can be used to encode data, such as digital media data, which can be in the form of a sequence of video frames. As more fully disclosed herein, in some implementations, the computer 1012 can include a plurality of processors that can be used to process data and perform computing tasks (e.g., encoding-related tasks and/or decoding-related tasks, etc.). In certain exemplary embodiments, the computer 1012 can include a codec 1005 that can contain, for example, an encoder component and/or decoder component, each of which can respectively function as more fully disclosed herein. The codec 1005 can perform various encoding and/or decoding tasks (e.g., coding video frames (e.g., based on sparse coding), identifying common dictionaries for use in coding of video content, generating dictionary elements, generating or modifying dictionaries, identifying video frames to use to generate dictionary elements, etc.) on data (e.g., sequentially or in parallel).

FIG. 11 is a schematic block diagram of a sample-computing environment 1100 with which the subject matter of this disclosure can interact. The sample-computing environment 1100 includes one or more client(s) 1110. The client(s) 1110 can be hardware and/or software (e.g., threads, processes, computing devices). The sample-computing environment 1100 also includes one or more server(s) 1130. Thus, sample-computing environment 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The sample-computing environment 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be appreciated and understood that components (e.g., encoder component, codec, decoder component, dictionary management component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone, electronic tablet, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
   receiving a first input video frame at a first device;
   generating a first sparse coding dictionary based at least in part on the first input video frame;
   generating a first encoded frame based on the first input video frame and the first sparse coding dictionary;
   generating, by a processor in response to instructions stored in a non-transitory computer readable medium, a second encoded frame based on a second input video frame, wherein on a condition that the first encoded video frame is unavailable to a second device, and on a condition that the first sparse coding dictionary is available to the second device for use in decoding a second encoded frame, generating the second encoded frame includes generating the second encoded frame using the first sparse coding dictionary; and
   transmitting the second encoded frame to the second device.

2. The method of claim 1, further comprising:
   transmitting the first encoded frame to a third device.

3. The method of claim 2, wherein generating the second encoded frame is performed on a condition that a first user included in the first input video frame is included in the second input video frame and on a condition that a first location included in the first input video frame is included in the second input video frame.

4. The method of claim 1, further comprising:
   transmitting or storing the first sparse coding dictionary such that the first sparse coding dictionary is available to the second device.

5. The method of claim 4, wherein transmitting or storing the first sparse coding dictionary includes:
   identifying a plurality of devices that includes the second device; and
   transmitting or storing the first sparse coding dictionary such that the first sparse coding dictionary is available to each device from the plurality of devices.

6. The method of claim 1, further comprising:
   on a condition that the first encoded video frame is unavailable to the second device, and on a condition that the first sparse coding dictionary is unavailable to the second device for use in decoding the second encoded frame, generating the second encoded frame includes:
- identifying a second sparse coding dictionary such that the second sparse coding dictionary is available to the first device for encoding the second encoded frame and is available to the second device for decoding the second encoded frame; and
- generating the second encoded frame using the second sparse coding dictionary.

7. A method comprising:
receiving a first input video frame at a first device;
generating a first sparse coding dictionary based at least in part on the first input video frame;
generating a first encoded frame based on the first input video frame and the first sparse coding dictionary;
transmitting the first encoded frame to a second device;
generating, by a processor in response to instructions stored in a non-transitory computer readable medium, a second encoded frame based on a second input video frame, wherein generating the second encoded frame includes:
- on a condition that a first user included in the first input video frame is included in the second input video frame, and on a condition that a first location included in the first input video frame is included in the second input video frame, and on a condition that the first encoded video frame is unavailable to a third device, and on a condition that the first sparse coding dictionary is available to the third device for use in decoding the second encoded frame, generating the second encoded frame using the first sparse coding dictionary, and
- on a condition that the first encoded video frame is unavailable to the third device, and on a condition that the first sparse coding dictionary is unavailable to the third device for use in decoding the second encoded frame, identifying a second sparse coding dictionary such that the second sparse coding dictionary is available to the first device for encoding the second encoded frame and is available to the third device for decoding the second encoded frame, and generating the second encoded frame using the second sparse coding dictionary; and
transmitting the second encoded frame to the third device.

8. The method of claim 7, further comprising:
transmitting or storing the first sparse coding dictionary such that the first sparse coding dictionary is available to the third device.

9. The method of claim 8, wherein transmitting or storing the first sparse coding dictionary includes:
identifying a plurality of devices that includes the third device; and
transmitting or storing the first sparse coding dictionary such that the first sparse coding dictionary is available to each device from the plurality of devices.

10. A method comprising:
receiving, at a first device, a first encoded frame generated by a second device based on a first input video frame using a first sparse coding dictionary generated by the second device based on a second input video frame;
generating a first reconstructed frame by decoding the first encoded frame, wherein decoding the first encoded frame includes:
- receiving the first sparse coding dictionary on a condition that a second encoded frame generated by the second device based on the second input video frame is unavailable to the first device, and
- decoding the first encoded frame using the first sparse coding dictionary; and outputting the first reconstructed frame for display.

11. The method of claim 10, wherein receiving the first sparse coding dictionary is performed in response to receiving a notification indicating that the first sparse coding dictionary.

12. The method of claim 10, wherein decoding the first encoded frame using the first sparse coding dictionary is performed on a condition that a first user included in the first input video frame is included in the second input video frame and on a condition that a first location included in the first input video frame is included in the second input video frame.

13. The method of claim 10, wherein decoding the first encoded frame using the first sparse coding dictionary is performed on a condition that a sparse coding dictionary identifier associate with the first sparse coding dictionary is associated with the first encoded frame.

14. The method of claim 10, wherein, on a condition that the second encoded video frame is unavailable to the first device, and on a condition that the first sparse coding dictionary is unavailable to the first device for use in decoding the first encoded frame, decoding the first encoded frame includes:
- identifying a second sparse coding dictionary such that the second sparse coding dictionary is available to the second device for encoding the first encoded frame and is available to the first device for decoding the first encoded frame; and
- decoding the first encoded frame using the second sparse coding dictionary.

* * * * *